United States Patent
Genda et al.

(10) Patent No.: US 8,941,275 B2
(45) Date of Patent: Jan. 27, 2015

(54) CONNECTING STRUCTURE FOR MOTOR

(71) Applicant: Honda Motor Co., Ltd., Tokyo (JP)

(72) Inventors: Tarou Genda, Wako (JP); Koichi Ono, Wako (JP); Satoshi Yamada, Wako (JP); Manabu Yazaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/356,638

(22) PCT Filed: Nov. 20, 2012

(86) PCT No.: PCT/JP2012/080087
§ 371 (c)(1),
(2) Date: May 7, 2014

(87) PCT Pub. No.: WO2013/077329
PCT Pub. Date: May 30, 2013

(65) Prior Publication Data
US 2014/0327332 A1    Nov. 6, 2014

(30) Foreign Application Priority Data
Nov. 22, 2011   (JP) .................................. 2011-255235

(51) Int. Cl.
*H02K 5/22*   (2006.01)
*H02K 16/00*  (2006.01)

(52) U.S. Cl.
CPC ................. *H02K 5/225* (2013.01); *H02K 16/00* (2013.01)
USPC ............................................ 310/71; 310/114

(58) Field of Classification Search
USPC ............................................ 310/71, 112–114
See application file for complete search history.

(56) References Cited

U.S. PATENT DOCUMENTS 7,893,581 B2 *   2/2011   Miura et al. .................... 310/71
2009/0256437 A1  10/2009  Miura et al.

FOREIGN PATENT DOCUMENTS

| JP | 6-98495 A | 4/1994 |
| JP | 8-223884 A | 8/1996 |
| JP | 2004-357432 A | 12/2004 |
| WO | 2008/007806 A1 | 1/2008 |

OTHER PUBLICATIONS

International Search Report dated Jan. 8, 2013 issued in application No. PCT/JP2012/080087.

* cited by examiner

*Primary Examiner* — Dang Le
(74) *Attorney, Agent, or Firm* — Westerman, Hattori, Daniels & Adrian, LLP

(57) ABSTRACT

A rotational axis of a first motor 102A and a rotational axis of a second motor 102B are disposed on the same straight line. A connector 72 of the first motor 102A and a connector 72B of the second motor 102B are disposed substantially in mirror symmetric positions, and a lead conductor 92*u*, 92*v*, 92*w* of the first motor 102A and a lead conductor 92*u*, 92*v*, 92*w* of the second motor 102B are disposed in non-mirror symmetric positions, and a size of a relay conductor 93*u*, 93*v*, 93*w* of the first motor 102A and a size of a relay conductor 93*u*, 93*v*, 93*w* of the second motor 102B differ from each other.

18 Claims, 14 Drawing Sheets

CONNECTING STRUCTURE FOR MOTOR

TECHNICAL FIELD

The present invention relates to a connecting structure for motor including two motors.

BACKGROUND ART

Patent Literature 1 discloses that two motors for controlling independently left and right wheels of a vehicle are installed in a back-to-back fashion so that rotational axes of the motors are aligned into the same straight line. As shown in FIG. 14, these two motors 202A, 202B are disposed in positions and forms in which their U-phase connecting points 273u, V-phase connecting points 273v and W-phase connecting points 273w are in mirror symmetry with each other with respect to a middle plane M which is situated between the motors 202A, 202B.

PRIOR ART LITERATURE

Patent Literature

Patent Literature 1: JP-H06-098495-A

SUMMARY OF THE INVENTION

Problem that the Invention is to Solve

In Patent Literature 1, nothing is disclosed on the connection between the U-phase connecting points 273u, V-phase connecting points 273v and W-phase connecting points 273w which are on the outside of a case and connecting portions which are in the inside of the case, and there has been room for improvement in using common parts between the left motor 202A and the right motor 202B.

The invention has been made in view of the above-described problem, and an object thereof is to provide a connecting structure for motor which can use as many common parts as possible which make up two motors.

Means for Solving the Problem

With a view to achieving the object, Claim 1 defines a connecting structure for motor including:
a first motor (e.g., a first motor 102A in embodiment); and
a second motor (e.g., a second motor 102B in embodiment), each of which includes:
  a motor main body (e.g., motor main bodies 2A, 2B in embodiment) including
    a stator (e.g., stators 14A, 14B in embodiment) having at least a first-phase winding (e.g., U-phase, V-phase or W-phase winding 80u, 80v, 80w in embodiment) and a first-phase lead conductor (e.g., a U-phase, V-phase or W-phase lead conductor 92u, 92v, 92w in embodiment) which outwardly extends from one end side of the first-phase winding and
    a rotor (e.g., rotors 15A, 15B in embodiment) which is disposed so as to rotate relative to the stator;
  a casing (e.g., side cases 11A, 11B in embodiment) which accommodates the motor main body;
  an inside-outside connecting conductor (e.g., connectors 72A, 72B in embodiment) which connects electrically an inside conductor with an outside conductor of the casing; and
  a first-phase relay conductor (e.g., a U-phase, V-phase or W-phase relay conductor 93u, 93v, 93w in embodiment) which is accommodated in the casing and which is connected to the first-phase lead conductor at one end side and is connected to the inside-outside connecting conductor at the other end side, wherein a rotational axis of the first motor and a rotational axis of the second motor are disposed on the same straight line (e.g., a straight line O in embodiment), wherein the inside-outside connecting conductor of the first motor and the inside-outside connecting conductor of the second motor are disposed substantially in mirror symmetric positions with respect to a middle plane (e.g., a middle plane M in embodiment) which intersects the straight line at right angles and which is situated between the first motor main body and the second motor main body, and the first-phase lead conductor of the first motor and the first-phase lead conductor of the second motor are disposed in non-mirror symmetric positions with respect to the middle plane, and wherein a size of the first-phase relay conductor of the first motor and a size of the first-phase relay conductor of the second motor differ from each other.

Claim 2 defines, based on Claim 1, the connecting structure for motor, wherein sizes of at least the respective stators of the first motor and the second motor are the same, and wherein a relative configuration form in which the first-phase lead conductor is disposed relative to the stator in the first motor and a relative configuration form in which the first-phase lead conductor is disposed relative to the stator in the second motor are the same.

Claim 3 defines, based on Claim 2, the connecting structure for motor, wherein the motor main body of the second motor is disposed such that the motor main body of the first motor is inverted relative to the middle plane or such that the motor main body of the first motor is inverted and the motor main body of the second motor is rotated relative to the motor main body of the first motor by a predetermined amount.

Claim 4 defines, based on any one of Claims 1 to 3, the connecting structure for motor, wherein the first-phase relay conductor includes a terminal (e.g., a U-phase, V-phase or W-phase connecting terminal 94u, 94v, 94w in embodiment) which is connected to the first-phase lead conductor at one end side and a bus bar (e.g., a U-phase, V-phase or W-phase bus bar 95u, 95v, 95w in embodiment) which is connected to the inside-outside connecting conductor at one end side, and the other end side of the terminal is connected to the other end side of the bus bar, and wherein a size of the bus bar of the first motor and a size of the bus bar of the second motor differ from each other, and a size of the terminal of the first motor and a size of the terminal of the second motor are the same with each other.

Claim 5 defines, based on Claim 4, the connecting structure for motor, wherein the first motor and the second motor each includes a terminal base (e.g., terminal bases 88A, 88B in embodiment) which holds the terminal and the bus bar.

Claim 6 defines, based on any one of Claims 1 to 5, the connecting structure for motor, wherein the first-phase lead conductor extends radially outwards of the first-phase winding.

Claim 7 defines, based on any one of Claims 1 to 6, the connecting structure for motor, wherein the first motor and the second motor each has a second-phase winding (e.g., the U-phase, V-phase or W-phase winding 80*u*, 80*v*, 80*w* in embodiment) and a third-phase winding (e.g., the U-phase, V-phase or W-phase winding 80*u*, 80*v*, 80*w* in embodiment) which are different from the first-phase winding, a second-phase lead conductor (e.g., the U-phase, V-phase or W-phase lead conductor 92*u*, 92*v*, 92*w* in embodiment) outwardly extends from one end side of the second-phase winding, and to third-phase lead conductor (e.g., the U-phase, V-phase or W-phase lead conductor 92*u*, 92*v*, 92*w* in embodiment) outwardly extends from one end side of the third-phase winding, wherein the first motor and the second motor each has a second-phase relay conductor (e.g., the U-phase, V-phase or W-phase relay conductor 93*u*, 93*v*, 93*w* in embodiment) which is accommodated in the casing and which is connected to the second-phase had conductor at one end side and is connected to the inside-outside connecting conductor at the other end side and a third-phase relay conductor (e.g., the U-phase, V-phase or W-phase relay conductor 93*u*, 93*v*, 93*w* in embodiment) which is accommodated in the casing and which is connected to the third-phase lead conductor at one end side and is connected to the inside-outside connecting conductor at the other end side, wherein the second-phase lead conductor of the first motor and the second-phase lead conductor of the second motor are disposed in non-mirror symmetric positions with respect to the middle plane, wherein a size of the second-phase relay conductor of the first motor and a size of the second-phase relay conductor of the second motor differ from each other, wherein the third-phase lead conductor of the first motor and the third-phase lead conductor of the second motor are disposed in non-mirror symmetric positions with respect to the middle plane, and wherein a size of the third-phase relay conductor of the first motor and a size of the third-phase relay conductor of the second motor differ from each other.

Claim 8 defines, based on any one of Claims 1 to 7, the connecting structure for motor, wherein the first motor is connected to a left wheel (e.g., a left rear wheel LWr in embodiment) of a vehicle (e.g., a vehicle 3 in embodiment), wherein the second motor is connected to a right wheel (e.g., a rear right wheel RWr in embodiment) of the vehicle, the first motor and the second motor are disposed at the left and right in a widthwise direction of the vehicle, and wherein the middle plane is situated substantially on a central laterally dividing plane in the widthwise direction of the vehicle.

Claim 9 defines, based en any one of Claims 1 to 8, the connecting structure for motor, further including:

a first motor controller (e.g., a first motor controller 8A in embodiment) which is connected to the inside-outside connecting conductor of the first motor;

a second motor controller (e.g., a second motor controller 8B in embodiment) which is connected to the inside-outside connecting conductor of the second motor;

a first different casing (e.g., a first controller case 114A in embodiment) which accommodates the first motor controller;

a second different casing (e.g., a second controller case 114B in embodiment) which accommodates the second motor controller;

a first different inside-outside connecting conductor (e.g., a connector 76A in embodiment) which connects electrically an inside conductor with an outside conductor of the first different casing;

a second different inside-outside connecting conductor (e.g., a connector 76B in embodiment) which connects electrically an inside conductor with an outside conductor of the second different casing, wherein the first different inside-outside connecting conductor and the second different inside-outside connecting conductor are disposed substantially in mirror symmetric positions with respect to the middle plane.

Claim 10 defines a connecting structure for motor including:

a first motor (e.g., a first motor 102A in embodiment); and a second motor (e.g., a second motor 102B in embodiment), each of which includes:

a motor main body (e.g., motor main bodies 2A, 2B in embodiment) including a stator (e.g., stators 14A, 14B in embodiment) having at least plural windings of plural phases including a first-phase winding (e.g., a U-phase, V-phase or W-phase winding 80*u*, 80*v*, 80*w* in embodiment) and a second-phase winding (e.g., the U-phase, V-phase or W-phase winding 80*u*, 80*v*, 80*w* in embodiment), a first-phase lead conductor (e.g., a U-phase, V-phase or W-phase lead conductor 92*u*, 92*v*, 92*w* in embodiment) which outwardly extends from one end side of the first-phase winding and a second-phase lead conductor (e.g., the U-phase, V-phase or W-phase lead conductor 92*u*, 92*v*, 92*w* in embodiment) which outwardly extends from one end side of the second-phase winding and a rotor (e.g., rotors 15A, 15B in embodiment) which is disposed so as to rotate relative to the stator;

a casing (e.g., side cases 11A, 11B in embodiment) which accommodates the motor main body;

inside-outside connecting conductors (e.g., connectors 72A, 72B in embodiment) each of which connects electrically an inside conductor with an outside conductor of the casing for each phase;

a first-phase relay conductor (e.g., a U-phase, V-phase or W-phase relay conductor 93*u*, 93*v*, 93*w* in embodiment) which is accommodated in the casing and which is connected to the first-phase lead conductor at one end side and is connected to the inside-outside connecting conductors at the other end side, and a second-phase relay conductor (e.g., the U-phase, V-phase or W-phase relay conductor 93*u*, 93*v*, 93*w* in embodiment) which is accommodated in the casing and which is connected to the second-phase lead conductor at one end side and is connected to the inside-outside connecting conductors at the other end side, wherein a rotational axis of the first motor and a rotational axis of the second motor are disposed on the same straight line (e.g., a straight line O in embodiment), wherein the first-phase lead conductor and the second-phase lead conductor of the second motor are disposed such that the first-phase lead conductor and the second-phase lead conductor of the first motor are inverted with respect to a middle plane (e.g., a middle plane M in embodiment) which intersects the straight line at right angles and which is situated between the first motor main body and the second motor main body or such that the first-phase lead conductor and the second-phase lead conductor of the first motor are inverted with respect to the middle plane and rotated relatively, and wherein a first-phase inside-outside connecting point (e.g., a U-phase, V-phase or W-phase connecting point 73*u*, 73*v*, 73*w* in embodiment) which is connected to the first-phase relay conductor and a second-phase inside-outside connecting point (e.g., the U-phase, V-phase or W-phase connecting point 73u, 73v, 73w in embodiment) which is connected to the second-phase relay conductors of the inside-outside connecting conductors of the second motor are disposed such that a first-phase inside-outside connecting point (e.g., the U-phase, V-phase or W-phase connecting point 73u, 73v, 73w in embodiment) which is connected to the first-phase relay conductor and a second-phase inside-outside connecting point (e.g., the U-phase, V-phase or W-phase connecting point 73u, 73v, 73w in embodiment) which is connected to the second-phase relay conductors of the inside-outside connecting conductors of the first motor are translated.

Claim 11 defines, based on Claim 10, the connecting structure for motor, wherein the inside-outside connecting conductors of the first motor and the inside-outside connecting conductors of the second motor are disposed substantially in mirror symmetric positions with respect to the middle plane.

Claim 12 defines, based on Claim 10 or 11, the connecting structure for motor, wherein the first-phase lead conductor and the second-phase lead conductor of the second motor are disposed such that the first-phase lead conductor and the second-phase lead conductor of the first motor are inverted with respect to the middle plane and rotated relatively, and an outgoing position (e.g., an outgoing position 99A in embodiment) of the first-phase lead conductor and the second-phase lead conductor of the first motor and an outgoing position (e.g., an outgoing position 99B in embodiment) of the first-phase lead conductor and the second-phase lead conductor of the second motor are disposed substantially in mirror symmetric positions with respect to the middle plane.

Claim 13 defines, based on any one of Claims 10 to 12, the connecting structure for motor, wherein sizes of the respective stators of the first motor and the second motor are the same, and wherein a relative configuration form in which the first-phase lead conductor and the second-phase lead conductor are disposed relative to the stator in the first motor and a relative configuration form in which the first-phase lead conductor and the second-phase lead conductor are disposed relative to the stator in the second motor are the same.

Claim 14 defines, based on any one of Claims 10 to 13, the connecting structure for motor, wherein the first-phase and second-phase lead conductors extend radially outwards of the first-phase and second-phase windings, respectively.

Claim 15 defines, based on any one of Claims 10 to 14, the connecting structure for motor, wherein the first motor is connected to a left wheel (e.g., a left rear wheel LWr in embodiment) of a vehicle (e.g., a vehicle 3 in embodiment), wherein the second motor is connected to a right wheel (e.g., a rear right wheel RWr in embodiment) of the vehicle, wherein the first motor and the second motor are disposed at the left and right in a widthwise direction of the vehicle, and wherein the middle plane is situated substantially on a central laterally dividing plane in the widthwise direction of the vehicle.

Claim 16 defines, based on Claim 15, the connecting structure for motor, wherein the vehicle is formed so that a longitudinal length is larger than a transverse length, and wherein the inside-outside connecting conductors of the first motor is disposed on, among side surfaces of the casing of the first motor, either (e.g., a side wall 11Af in embodiment) of side surfaces which face a front and a rear of the vehicle, and the inside-outside connecting conductors of the second motor is disposed on, among side surfaces of the casing of the second motor, either (e.g., a side wall 11Bf in embodiment) of side surfaces o which face the front and the rear of the vehicle.

Claim 17 defines, based on Claim 16, the connecting structure for motor, wherein the inside-outside connecting conductors of the first motor and the inside-outside connecting conductors of the second motor are disposed on, among the side surfaces which face the front and the rear of the vehicle, either of the side surfaces which lies closer to a longitudinal center of the vehicle.

Claim 18 defines, based on any one of Claims 10 to 17, the connecting structure for motor, further including:

a first motor controller (e.g., a first motor controller 8A in embodiment) which is connected to the inside-outside connecting conductors of the first motor;

as second motor controller (e.g., a second motor controller 8B in embodiment) which is connected to the inside-outside connecting conductors of the second motor;

a first different casing (e.g., a first controller case 114A in embodiment) which accommodates the first motor controller;

a second different casing (e.g., a second controller case 114B in embodiment) which accommodates the second motor controller;

a first different inside-outside connecting conductor (e.g., a connector 76A in embodiment) which connects electrically an inside conductor with an outside conductor of the first different casing;

a second different inside-outside connecting conductor (e.g., a connector 76B in embodiment) which connects electrically an inside conductor with an outside conductor of the second different casing, wherein the first different inside-outside connecting conductor and the second different inside-outside connecting conductor are disposed substantially in mirror symmetric positions with respect to the middle plane.

Advantage of the Invention

According to Claim 1, the attaching and detaching properties of power cables such as AC cables to the first motor and the second motor can be enhanced by disposing the inside-outside connecting conductors where the power cables such as AC cables are attached and detached in the mirror symmetric positions in the first motor and the second motor. Since the difference in position of the first-phase lead conductor relative to the inside-outside connecting conductor between the first motor and the second motor can be absorbed only by providing the first-phase relay conductors having the different sizes, as many other members as possible can be used commonly to the first and second motors.

According to Claim 2, the stators have the same sizes and the relative configuration forms in which the first-phase lead conductors are disposed are the same between the first and second motors, whereby at least the stators and the first-phase lead conductors can be used commonly to the first and second motors.

According to Claim 3, with at least the stators and the first-phase lead conductors remaining to be common to the first motor and the second motor, the symmetry of the first motor with the second motor is enhanced, and hence, more peripheral members can be used commonly thereto.

According to Claim 4, the first-phase relay conductor is made up of the plural members, and the terminal as a part of the members is made common to the first and second motors, whereby there are more members which can be common thereto.

According to Claim 5, the temporary holding of the bus bars and the connection between the terminal and the bus bar can be facilitated According to Claim 6, since the axial enlargement can be suppressed to lie nearer to the inside-outside connecting conductor, the size of the first-phase relay conductor can be reduced.

According to Claim 7, even with the three-phase configuration adopted, the attaching and detaching properties of power cables such as AC cables to and from the first motor and the second motor can be enhanced, and as many members as possible can be used commonly.

According to Claim 8, the inside-outside connecting conductors of the first motor and the second motor to and from which power cables such as AC cables are attached and detached are disposed in the laterally mirror symmetric positions in the vehicle, and therefore, a working person who works on the first and second motors from the front or rear thereof is allowed to work on them easily. The first and second motors are arranged so as to have the lateral symmetry, and therefore, the straight line stability and turning stability of the vehicle are enhanced.

According to Claim 9, in addition to the inside-outside connecting conductors, the other inside-outside connecting conductors which are connected to the motor controllers become mirror symmetric with each other with respect to the same middle plane, and therefore, power cables such as AC cables which connect the motors with the motor controllers can further be used commonly to the first and second motors.

According to Claim 10, the first-phase lead conductor and the second-phase lead conductor of the second motor are disposed such that the first-phase lead conductor and the second-phase lead conductor of the first motor are inverted with respect to the middle plane or such that the first-phase lead conductor and the second-phase lead conductor of the first motor are inverted and rotated relatively. Therefore, the relative configuration form in which the first-phase lead conductor and the second-phase lead conductor are disposed relative to the motor can be common to the first motor and the second motor. The first-phase inside-outside connecting point which is connected to the first-phase relay conductor and the second-phase inside-outside connecting point which is connected to the second-phase relay conductor of the inside-outside connecting conductors of the second motor are disposed such that the first-phase inside-outside connecting point which is connected to the first-phase relay conductor and the second-phase inside-outside connecting point which is connected to the second-phase relay conductor of the inside-outside connecting conductors of the first motor are translated. Therefore, power cables such as AC cables can be connected in the same relative configuration form. This can realize a reduction in costs as a result of a reduction in the number of components, and the attaching and detaching properties of power cables can be enhanced.

According to Claim 11, in addition to the configuration in which the order in which the connecting points of the inside-outside connecting conductors are aligned is the same in the first and second motors, the inside-outside connecting conductors are disposed substantially in the mirror symmetric position in the first motor and the second motor. Therefore, the attaching and detaching properties of power cables such as AC cables can be enhanced, and the length of power cables can be common in the first and second motors.

According to Claim 12, although the individual lead conductors of the three phases are disposed in the asymmetric positions, the lead conductors are disposed substantially in the mirror symmetric as a whole, whereby the symmetry of the first motor with the second motor is enhanced, and the peripheral members of the lead conductor can be used commonly to the first and second motors.

According to Claim 13, the stators have the same sizes and the relative configuration forms in which the first-phase and second-phase lead conductors are disposed are the same between the first and second motors, whereby at least the stators and the first-phase and second-phase lead conductors can be used commonly to the first and second motors.

According to Claim 14, since the axial enlargement can be suppressed to lie nearer to the inside-outside connecting conductors, the size of the first-phase and second-phase relay conductors can be reduced.

According to Claim 15, the first and second motors are disposed so as to have the lateral symmetry, and hence, the straight line stability and turning stability of the vehicle are enhanced.

According to Claim 16, since the vehicle is formed so that the longitudinal length is larger than the transverse length, space is easier to be ensured in the longitudinal direction than in the transverse direction and a vertical direction of the vehicle. Therefore, the inside-outside connecting conductors can be disposed without any difficulty when the first and second motors are installed. Even though an external force is inputted into the vehicle, the damage to the vehicle can be reduced. Similarly, the attaching and detaching of power cables is facilitated with the first and second motor installed in the vehicle.

According to Claim 17, when an external force is inputted into the vehicle from the front or rear of the vehicle, the damage to the inside-outside connecting conductors can be reduced further.

According to Claim 18, in addition to the inside-outside connecting conductors, the other inside-outside connecting conductors which are connected to the motor controllers become mirror symmetric with each other with respect to the same middle plane, and therefore, power cables which connect the motors with the motor controllers can be common further to the first and second motors.

MODE FOR CARRYING OUT THE INVENTION

Figure 1:
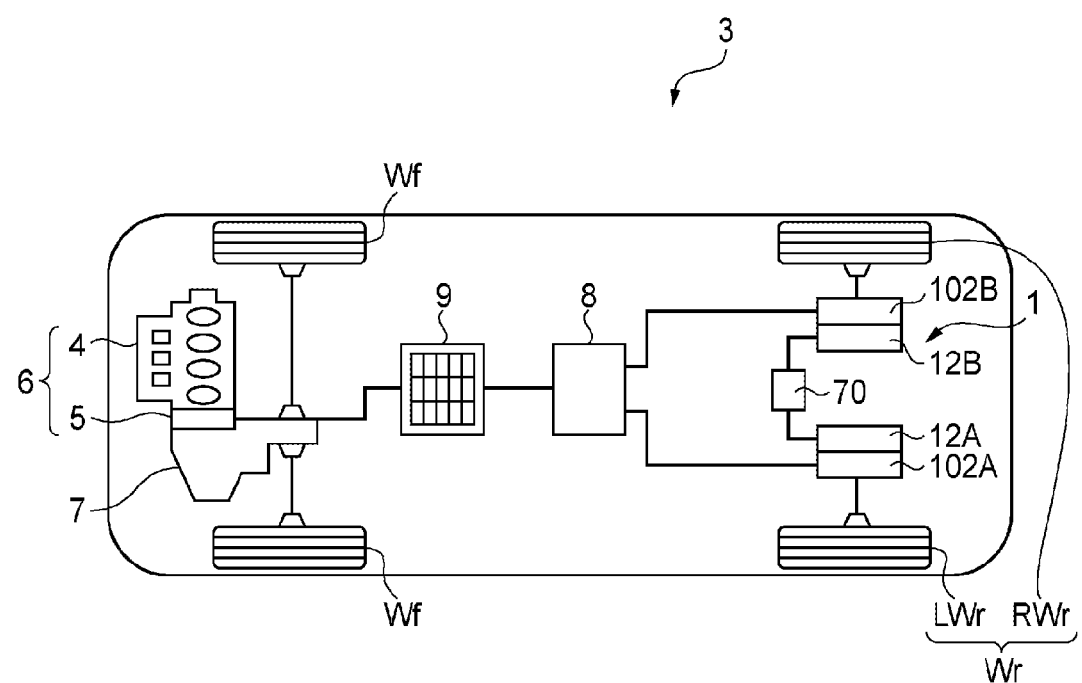
FIG. 1 is a block diagram showing a schematic configuration of a hybrid vehicle which constitutes an embodiment of a vehicle in which a vehicle drive system is installed which includes a connecting structure for motor according to the invention.

A connecting structure for motor according to the invention can preferably be applied to a vehicle drive system. A vehicle drive system which will be described below is used in a vehicle which installs a drive system as shown in FIG. 1. While a vehicle drive system will be described as being used as a rear-wheel drive system in the following description, the vehicle drive system may be used as a front-wheel drive system.

A vehicle 3 shown in FIG. 1 is a hybrid vehicle having a drive system 6 in which an internal combustion engine 4 and a motor 5 are connected in series (hereinafter, referred to as a front-wheel drive system) at a front part of the vehicle. The power of the front-wheel drive system 6 is delivered to front wheels Wf via a transmission 7, whereas the power of a drive system 1 which is provided separately from the front-wheel drive system 6 at a rear part of the vehicle (hereinafter, referred to as a rear-wheel drive system) is delivered to rear wheels Wr (RWr, LWr). The motor 5 of the front-wheel drive system 6 and first and second motors 102A, 102B of the rear-wheel drive system 1 at the side of the rear wheels Wr are connected to a battery 9 via a controller 8, whereby electric power from the battery 9 can be supplied to the motors, and energy at the motors can be recovered to the batteries.

Figure 2:
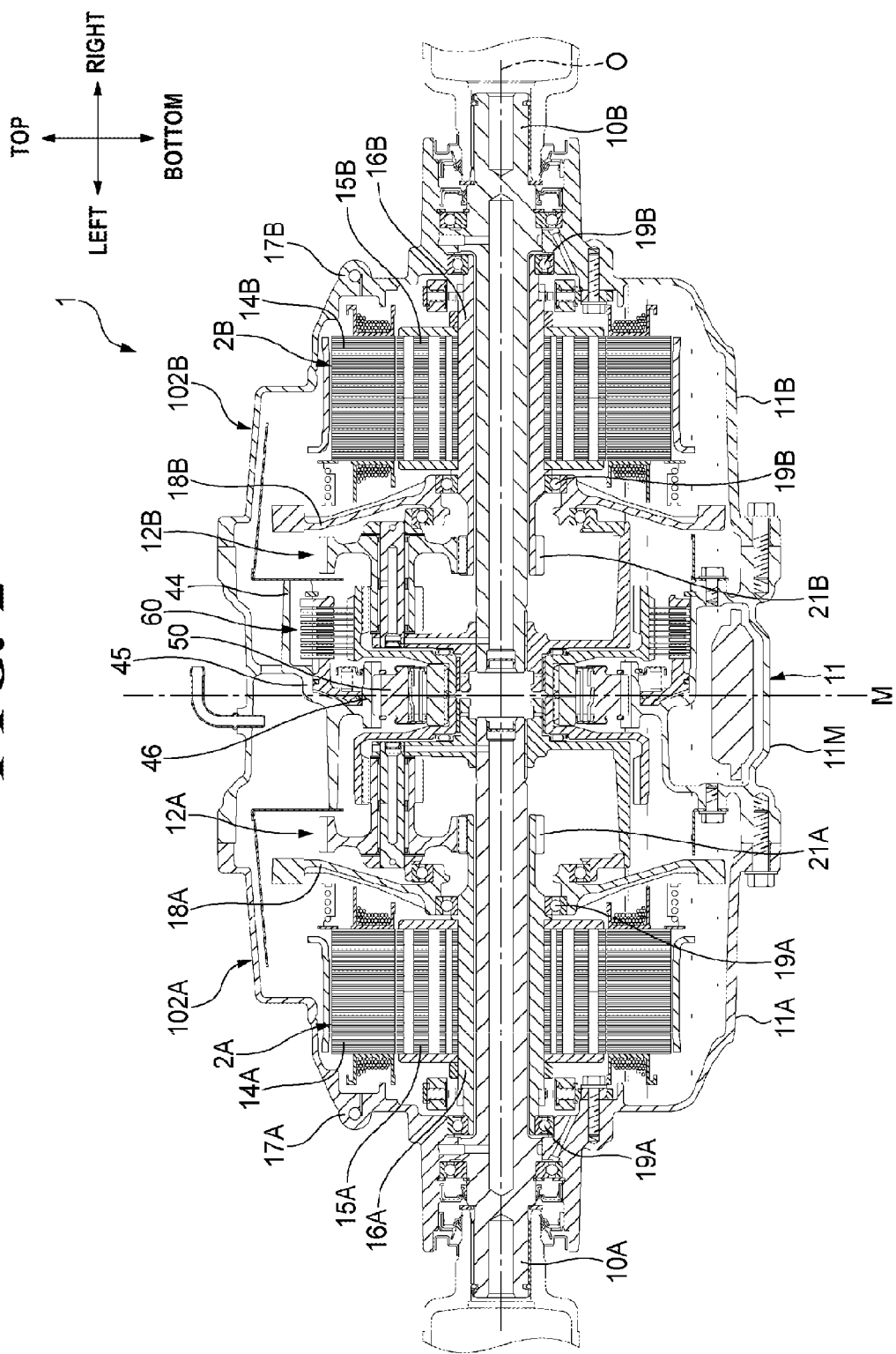
FIG. 2 is a vertical sectional view of a rear-wheel drive system.
Figure 3:
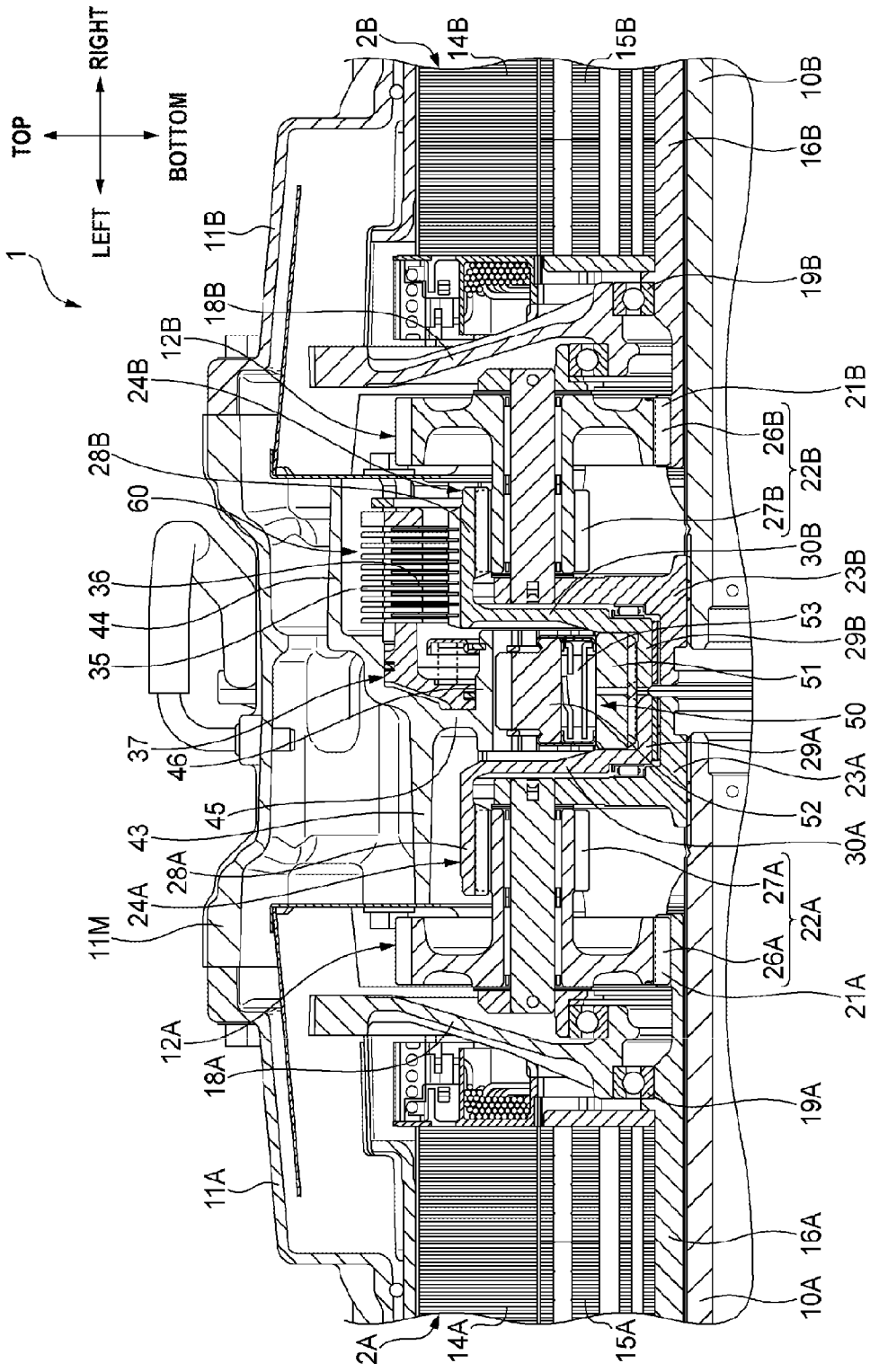
FIG. 3 is a partial enlarged view of the rear-wheel drive system shown in FIG. 2.

FIG. 2 shows a vertical sectional view of the rear-wheel drive system 1, and FIG. 3 is an enlarged sectional view of an upper part of FIG. 2. Arrows in the drawings indicate a positional relationship such that the rear-wheel drive system 1 is installed in the vehicle. In the drawings, reference numeral 11 denotes a case for the rear-wheel drive system 1, and the case 11 includes a middle case 11M which is disposed substantially at a central portion in a widthwise direction of the vehicle, as well as a side case 11A which makes up part of the first motor 102A (also referred to as an L-side motor) and a side case 11B which makes up put of the second motor 102B (also referred to as an R-side motor), the side cases being disposed to the left and right of the middle case 11M so as to sandwich the middle case 11M. The case 11 is formed substantially into a cylindrical shape as a whole. Axles 10A, 10B for the rear wheels Wr, first and second motor main bodies 2A, 2B which make up main portions of the axle driving first and second motors 102A, 102B, and first and second planetary gear speed reducers 12A, 12B which reduce the speed at which the first and second motor main bodies 2A, 2B are driven to rotate are disposed in the case 11 so that their rotational axes are situated on the same straight line O. The axle 10A, the first motor main body 2A and the first planetary gear speed reducer 12A control the driving of the left rear wheel LWr, and the axle 10B, the second motor main body 2B and the second planetary gear speed reducer 12B control the driving of the right rear wheel RWr. The axle 10A, the first motor main body 2A and the first planetary gear speed reducer 12A and the axle 10B, the second motor main body 2B and the second planetary gear speed reducer 12B are disposed laterally symmetric with each other in the widthwise direction of the vehicle with respect to a middle plane M which intersects the straight line O at right angles and which is positioned centrally within the case 11. This middle plane M coincides with a central laterally dividing plane N (refer to FIG. 9) in the widthwise direction (the transverse direction) of the vehicle 3.

Bulkheads 18A, 18B which each extend radially inwards are provided, respectively, at sides of the side cases 11A, 11B which face the middle case 11M, and the first and second motor main bodies 2A, 2B are disposed within spaces surrounded by the side cases 11A, 11B and the bulkheads 18A, 18B, respectively. The first and second planetary gear speed reducers 12A, 12B are disposed within spaces surrounded by the middle case 11M and the bulkheads 18A, 18B, respectively.

In the first and second motor main bodies 2A, 2B, stators 14A, 14B are fixed to the side cases 11A, 11B, respectively, and annular rotors 15A, 15B are disposed rotatably on inner circumferential sides of the stators 14A, 14B, respectively. Cylindrical shafts 16A, 16B which are output shafts of the first and second motors 102A, 102B which surround outer circumferences of the axles 10A, 10B are connected to inner circumferential portions of the rotors 15A, 15B, respectively, and the cylindrical shafts 16A, 16B are supported at end walls 17A, 17B of the side cases 11A, 11B and the bulkheads 18A, 18B via bearings 19A, 19B, respectively, so as to rotate relative to and coaxially with the axles 10A, 10B.

The first and second planetary gear speed reducers 12A, 12B include sun gears 21A, 21B, ring gears 24A, 24B which are situated on an outer circumferential side of the sun gears 21A, 21B, pluralities of planetary gears 22A, 22B which mesh with the sun gears 21A, 21B and the ring gears 24A, 24B, and planetary carriers 23A, 23B which support the planetary gears 22A, 22B, respectively. Driving forces of the first and second motor main bodies 2A, 2B are inputted from the sun gears 21A, 21B, and the driving forces whose speeds are reduced are outputted to the axles 10A, 10B by way of the planetary carriers 23A, 23B.

The sun gears 21A, 21B are formed integrally with the cylindrical shafts 16A, 16B, respectively. The planetary gears 22A, 22B are double pinions which have first pinions 26A, 26B of a large diameter which mesh directly with the sun gears 21A, 21B and second pinions 27A, 27B of a diameter which is smaller than that of the first pinions 26A, 26B, and these first pinions 26A, 26B and second pinions 27A, 27B are formed integrally so that the first and second pinions are concentric and are offset in an axial direction. The planetary gears 22A, 22B are supported on the planetary carriers 23A, 23B, and axial inner end portions of the planetary carriers 23A, 23B extend radially inwards and are then spline fitted to be supported on the axles 10A, 10B so as to rotate together therewith.

The ring gears 24A, 24B include gear portions 28A, 28B which mesh with the second pinions 27A, 27B of the smaller diameter at inner circumferential surfaces thereof, small-diameter portions 29A, 29B which are smaller in diameter than the gear portions 28A, 28B and which are disposed to face each other at a middle position of the case 11, and connecting portions 30A, 30B which connect radially axial inner end portions of the gear portions 28A, 28B with axial outer end portions of the small-diameter portions 29A, 29B.

The gear portions 28A, 28B face each other axially so as to sandwich therebetween a cylindrical wall 46 which is formed at a radially inward end portion of a laterally dividing wall 45 of the middle case 11M. The small-diameter portions 29A, 29B are individually spline fitted in an inner race 51 of a one-way clutch 50, which will be described later, at outer circumferential surfaces thereof, and the ring gears 24A, 24B are connected to each other so as to rotate together with the inner race 51 of the one-way clutch 50.

A hydraulic brake 60 which makes up a brake unit for the ring gear 24B and the one-way clutch 50 are provided in the middle case 11M which makes up the case 11. The hydraulic brake 60 includes plural stationary plates 35 which are spline fitted in an inner circumferential surface of a cylindrical wall 44 in the middle case 11M and plural rotational plates 36 which are spline fitted on an outer circumferential surface of the gear portion 28B of the ring gear 24B, and the stationary plates 35 and the rotational plates 36 are disposed alternately in the axial direction, whereby the plates 35, 36 are engaged with and disengaged from each other by an annular piston 37. Consequently, when both the plates 35, 36 are pressed against each other by the piston 37, a braking force is applied to the ring gear 24B as a result of a frictional engagement being produced between both the plates 35, 36, whereby the ring gear 24B is fixed. When the plates 35, 36 are released from that engaged state due to the piston 37, the ring gear 24B is permitted to rotate freely. As described above, since the ring gears 24A, 24B are connected to each other, the braking force is also applied to the ring gear 24A to be fixed by the application of the hydraulic brake 60, whereas the ring gear 24A is permitted to rotate freely by the release of the hydraulic brake 60.

The one-way clutch 50 is such that a number of sprags 53 are interposed between the inner race 51 and an outer race 52, and the inner race 51 rotates together with the small-diameter portions 29A, 29B of the ring gears 24A, 24B through spline fitting. The outer race 52 is positioned and locked so as not to rotate by the cylindrical wall 46 of the middle case 11M.

The one-way clutch 50 is engaged to lock the rotation of the ring gears 24A, 24B when the vehicle 3 travels forwards by the power of the first and second motors 102A, 102B. To describe this more specifically, the one-way clutch 50 is engaged when the rotational power of the first and second motors 102A, 102B in a forward direction (a direction in which the vehicle 3 travels forwards) is inputted into the rear wheels Wr, whereas the one-way clutch 50 is disengaged when the rotational power of the first and second motors 102A, 102B in a reverse direction is inputted into the rear wheels Wr. The one-way clutch 50 is disengaged when the rotational power of the rear wheels Wr in a forward direction is inputted into the first and second motors 102A, 102B, whereas the one-way clutch 50 is engaged when the rotational power of the rear wheels Wr in a reverse direction is inputted into the first and second motors 102A, 102B.

In this way, in the rear-wheel drive system 1 of this embodiment, the one-way clutch 50 and the hydraulic brake 60 are provided in parallel on a power transmission path between the first and second motors 102A, 102B and the rear wheels Wr. The hydraulic brake 60 is controlled to be in a released state, a slightly applied state and an applied state by the pressure of oil which is supplied from an electric oil pump 70 (refer to FIG. 1) according to the driving conditions of the vehicle or whether the one-way clutch 50 is engaged or disengaged. For example, when the vehicle 3 travels forwards based on the power-running drive of the first and second motors 102A, 102B (at low vehicle speeds, middle vehicle speeds), although power can be transmitted since the one-way clutch 50 is engaged, even when the one-way clutch 50 is disengaged as a result of a temporary reduction in the input of the forward rotational power from the first and second motors 102A, 102B due to the hydraulic brake 60 being controlled to be in the slightly applied state, it is suppressed that power becomes unable to be transmitted between the first and second motors 102A, 102B and the rear wheels Wr. When the vehicle 3 travels forwards based on the internal combustion engine 4 and/or the power-running drive of the motor 5 (at high vehicle speeds), the over revolution of the first and second motors 102A, 102B is prevented by the one-way clutch 50 being disengaged and further, the hydraulic brake being controlled to be in the released state. On the other hand, when the vehicle 3 is reversed or regeneration is executed, the reverse rotational power from the first and second motors 102A, 102B is outputted to the rear wheels Wr or the forward rotational power on the rear wheels Wr is inputted into the first and second motors 102A, 102B as a result of the hydraulic brake 60 being controlled to be in the applied state due to the one-way clutch 50 being disengaged.

Here, the connecting structure for motor of the invention will be described in detail.

As shown in FIGS. 4 to 7, the first and second motors 102A, 102B are three-phase AC motors and have a first and second motor main bodies 2A, 2B which include stators 14A, 14B which each include windings (a U-phase, V-phase and W-phase windings $80u$, $80v$, $80w$) of three phases including a U phase, a V phase and a W phase and lead conductors (a U-phase, V-phase and W-phase lead conductors $92u$, $92v$, $92w$) which outwardly extend from one end of each of the windings (the U-phase, V-phase and W-phase windings $80u$, $80v$, $80w$) and rotors 15A, 15B which are disposed so as to rotate relative to the stators 14A, 14B, the side cases 11A, 11B which accommodate the first and second motor main bodies 2A, 2B, respectively, connectors 72A, 72B which connect electrically inside conductors with outside conductors of the side cases 11A, 11B by phase, and relay conductors (a U-phase, V-phase and W-phase relay conductors $93u$, $93v$, $93w$) which are accommodated in the side cases 11A, 11B and which are connected to the lead conductors (the U-phase, V-phase and W-phase lead conductors $92u$, $92v$, $92w$) at one ends and are connected to the connectors 72A, 72B at the other ends thereof.

To describe this more specifically, in the stators 14A, 14B of the first and second motors 102A, 102B, the three U-phase, V-phase and W-phase windings (the U-phase, V-phase and W-phase windings $80u$, $80v$, $80w$) are individually wound around divided cores via insulating bobbins to make up four divided stator pieces (U-phase, V-phase and W-phase divided stator pieces $90u$, $90v$, $90w$) for each of U phase, V phase and W phase. The U-phase, V-phase and W-phase divided stator pieces (the U-phase, V-phase and W-phase divided stator pieces $90u$, $90v$, $90w$) are disposed clockwise sequentially in this order as seen from an inside of the case 11 (the side of the middle plane M). The divided stator pieces (the U-phase, V-phase and W-phase divided stator pieces $90u$, $90v$, $90w$) of the respective phases may be such that one or plural windings are continuously wound around the divided stator pieces of each phase or such that adjacent divided stator pieces are connected to each other by one or plural windings. In this embodiment, the four divided stator pieces (the U-phase, V-phase and W-phase divided stator pieces $90u$, $90v$, $90w$) of each phase make up one divided stator piece group (a U-phase, V-phase and W-phase divided stator piece groups 91u, 91v, 91w).

One end portion of the U-phase winding 80u of the U-phase divided stator piece group 91u extends radially outwards to make up the U-phase lead conductor 92u, one end portion of the V-phase winding 80v of the V-phase divided stator piece group 91v extends radially outwards to make up the V-phase lead conductor 92v, and one end portion of the W-phase winding 80w of the W-phase divided stator piece group 91w extends radially outwards to make up the W-phase lead conductor 92w. The other end portions of the windings (the U-phase, V-phase and W-phase windings 80u, 80v, 80w) of the divided stator piece groups (the U-phase, V-phase and W-phase divided stator piece groups 91u, 91v, 91w) extend radially outwards to make up a lead conductor 92n.

In the above-described first and second motors 102A, 102B, the stators 14A, 14B have the same sizes, and in addition to this, the individual windings (the U-phase, V-phase and W-phase windings 80u, 80v, 80w) which make up the divided stator piece groups (the U-phase, V-phase and W-phase divided stator piece groups 91u, 91v, 91w) and the lead conductors (the U-phase, V-phase and W-phase lead conductors 92u, 92v, 92w) are configured and disposed the same. Namely, a relative configuration form in which the lead conductors 92u, 92v, 92w are disposed relative to the stator 14A in the first motor 102A and a relative configuration form in which the lead conductors 92u, 92v, 92w are disposed relative to the stator 14B in the second motor 102B are the same, and they are fabricated by the same fabrication method without any discrimination. The lead conductors (the U-phase, V-phase and W-phase lead conductors 92u, 92v, 92w) may extend individually radially outwards relative to the windings (the U-phase, V-phase and W-phase windings 80u, 80v, 80w) as in this embodiment or may extend axially outwards. In this embodiment, the rotors 15A, 15B have the same sizes and configurations and are fabricated by the same fabrication method without any discrimination.

Figure 10A:
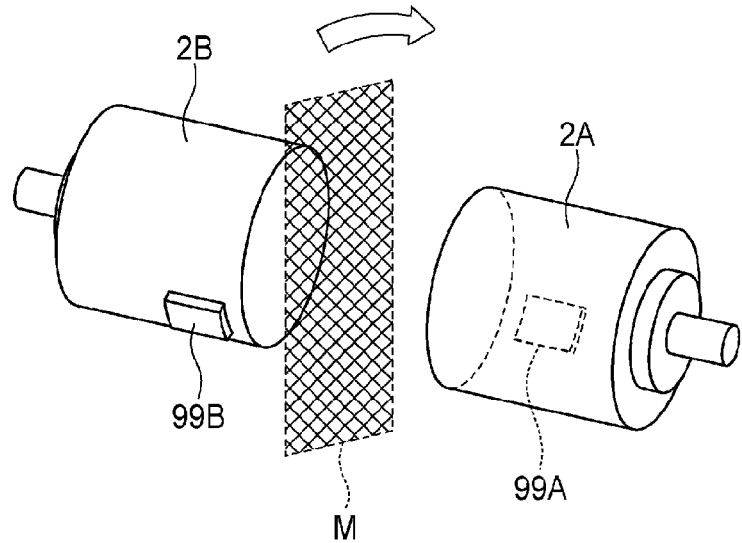
FIG. 10(a) is a schematic diagram showing a state in which a first motor main body is inverted relative to a second motor main body.
Figure 10B:
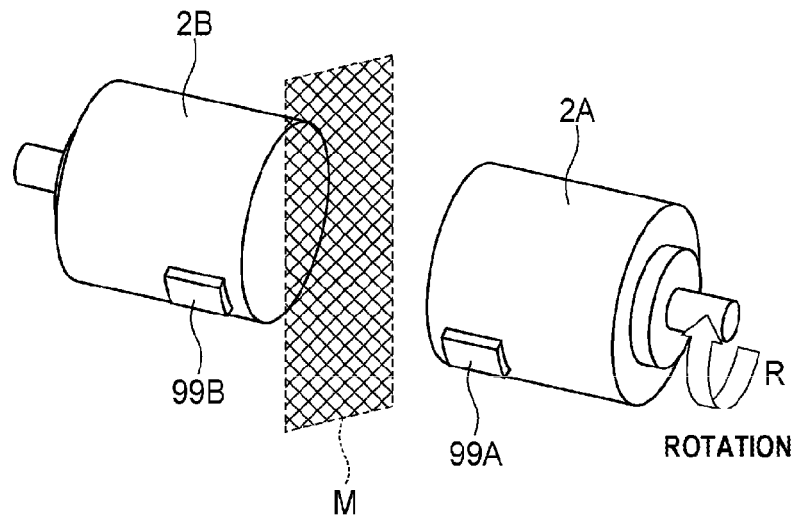
FIG. 10(b) is a schematic diagram showing a state in which the first motor main body is rotated by a predetermined amount relative to the second motor main body.

The first motor main body 2A is disposed such that the second motor main body 2B is inverted relative to the middle plane M as shown in FIG. 10(a) and the first motor main body 2A is rotated relatively in a direction indicated by an arrow R by a predetermined amount as shown in FIG. 10(b). By doing so, an outgoing position 99A of the lead conductors (the U-phase, V-phase and W-phase lead conductors 92u, 92v, 92w) of the first motor 102A and an outgoing position 99B of the lead conductors (the U-phase, V-phase and W-phase lead conductors 92u, 92v, 92w) of the second motor 102B are disposed substantially in mirror symmetric positions with respect to the middle plane M and are disposed at lower portions of front side walls 11Af, 11Bf of the case 11 (also, refer to FIG. 4).

Figure 5:
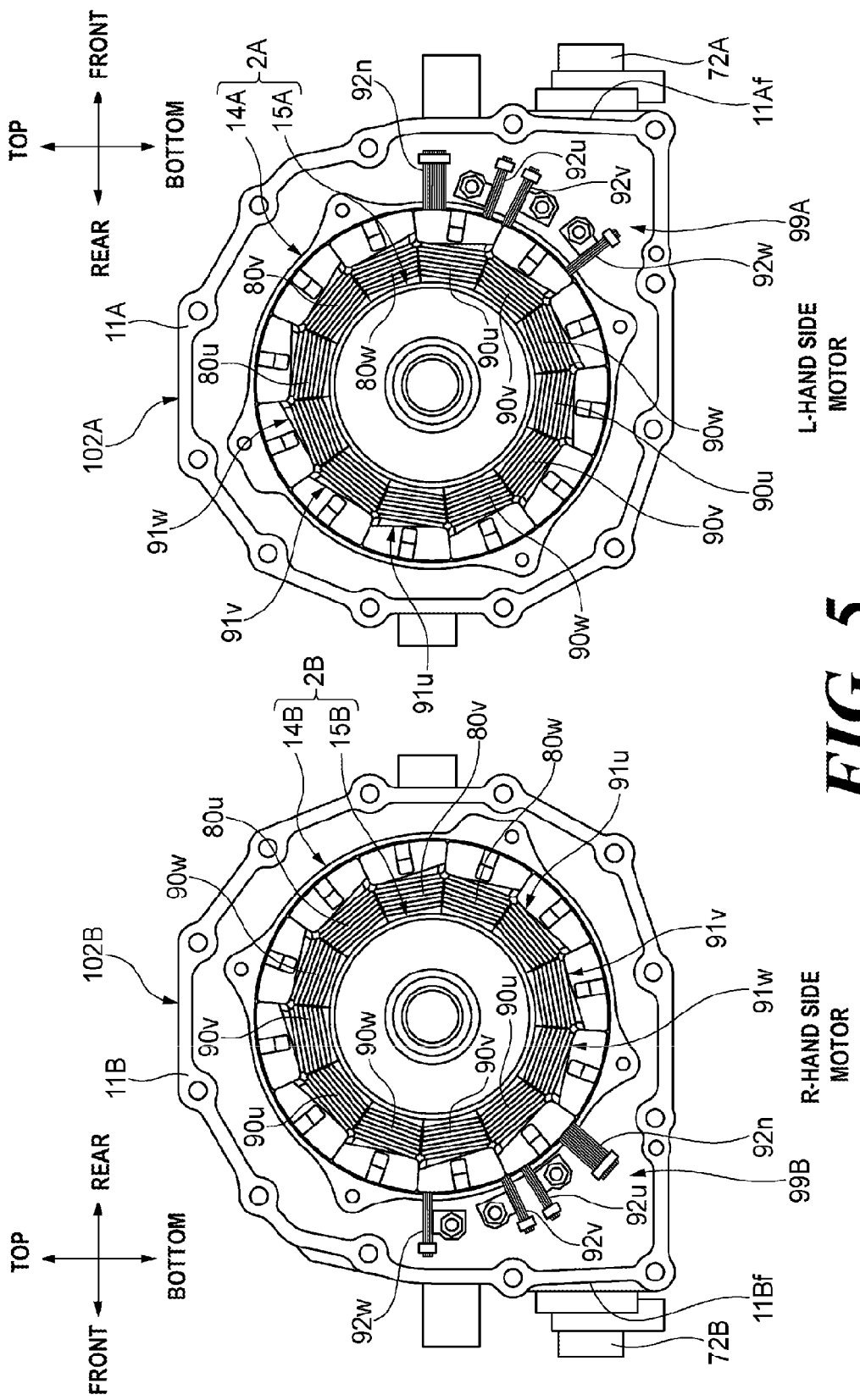
FIG. 5 shows front views of the first motor and the second motor as seen from a middle plane, which depict the relative positional relationship therebetween.

On the other hand, a relative configuration form in which the lead conductors (the U-phase, V-phase and W-phase lead conductors 92u, 92v, 92w) of the three phases are disposed in the first motor 102A and a relative configuration form in which the lead conductors (the U-phase, V-phase and W-phase lead conductors 92u, 92v, 92w) of the three phases are disposed in the second motor 102B are non-mirror symmetric with each other with respect to the middle plane M. Namely, as shown in FIGS. 5 and 7, in the first motor 102A, the U-phase lead conductor 92u, the V-phase lead conductor 92v and the W-phase lead conductor 92w are disposed clockwise in a descending order, whereas in the second motor 102B, the U-phase lead conductor 92u, the V-phase lead conductor 92v and the W-phase lead conductor 92w are disposed clockwise in an ascending order.

Figure 4:
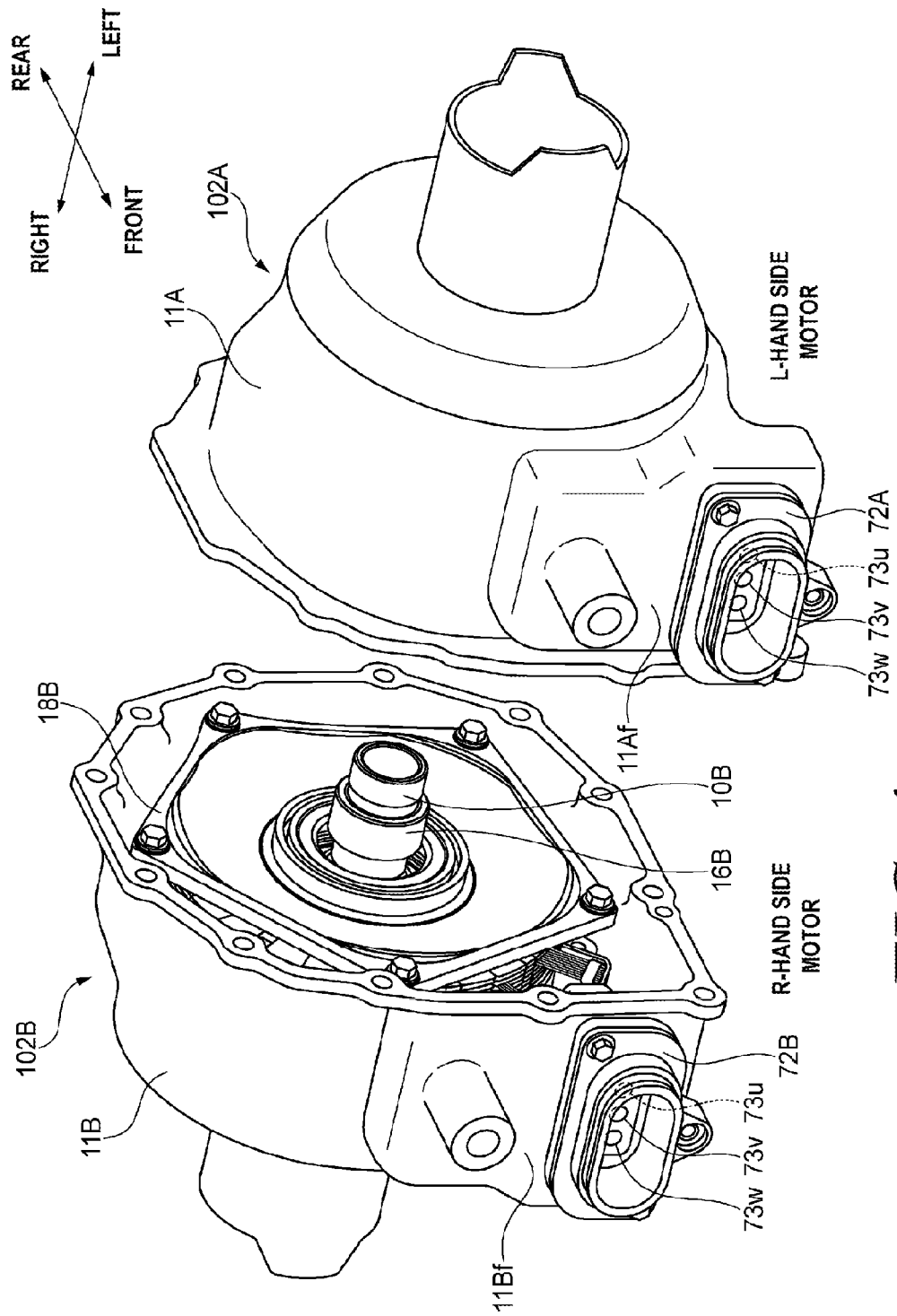
FIG. 4 shows perspective views of a first motor and a second motor, which depict a relative positional relationship therebetween.
Figure 6:
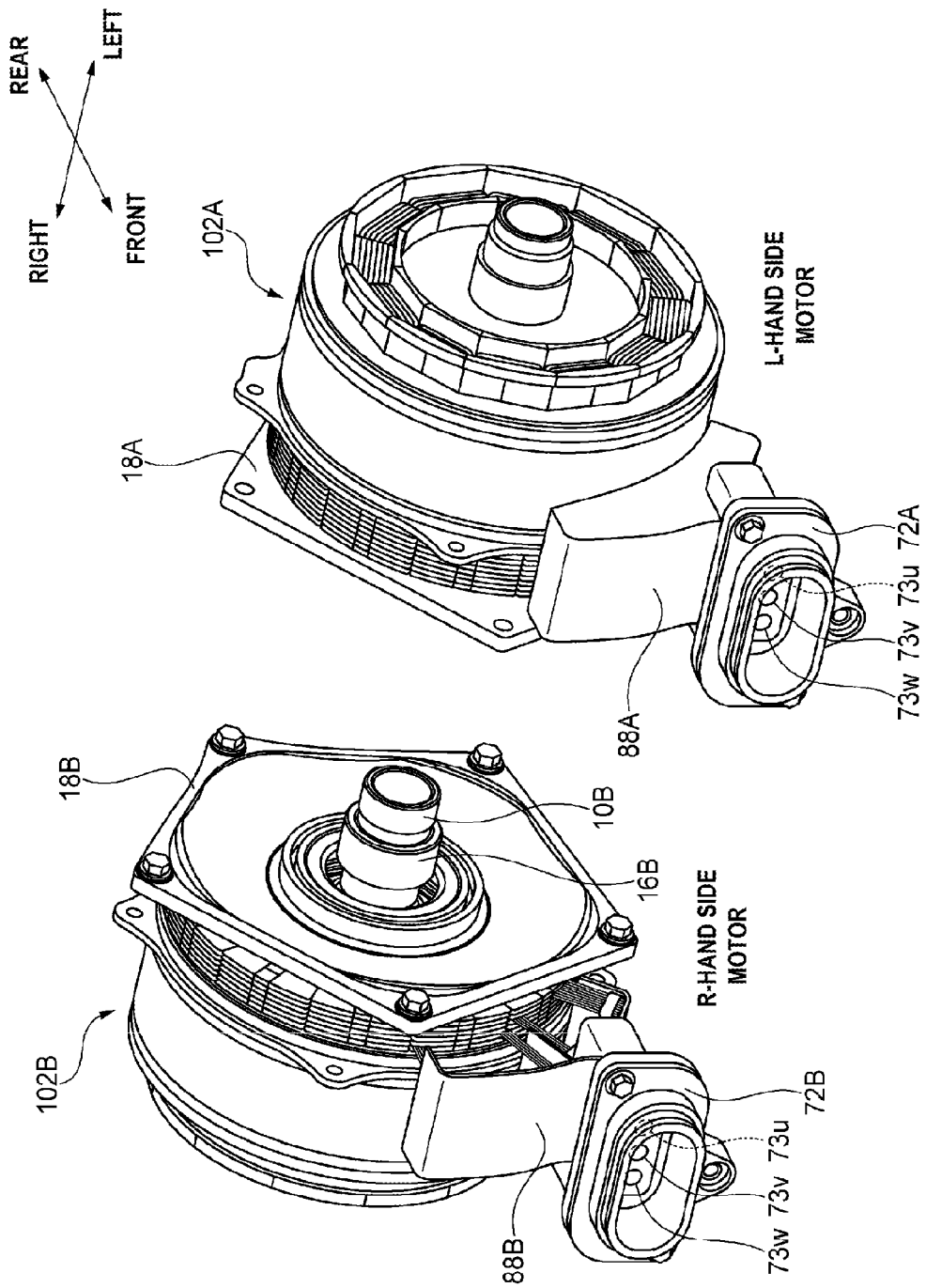
FIG. 6 shows perspective views of the first motor and the second motor with a case therefor removed from FIG. 4.
Figure 11:
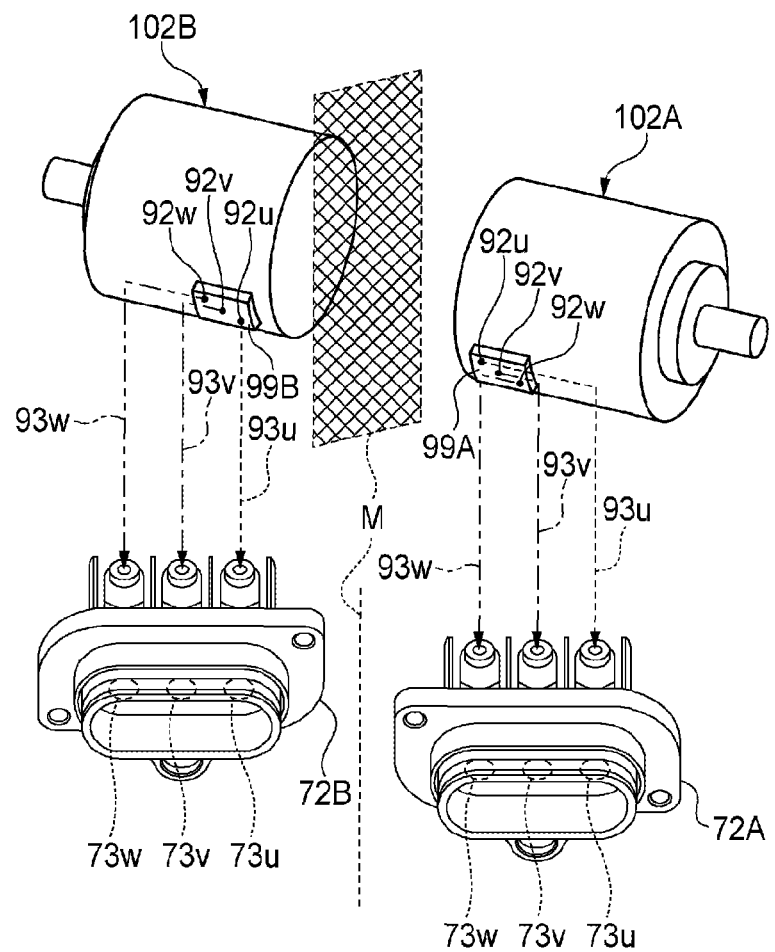
FIG. 11 is a schematic diagram depicting a difference in sizes between a relay conductor of the first motor and a relay conductor of the second motor.

As shown in FIGS. 4, 6 and 11, the connector 72A of the first motor 102A and the connector 72B of the second motor 102B are disposed in positions which are substantially mirror symmetric with each other with respect to the middle plane M and are disposed at lower portions of the first and second motors 102A, 102B which lie close to the middle plane M. The rear-wheel drive system 1 including the first and second motors 102A, 102B is positioned below a floor panel (not shown), and the connectors 72A, 72B can be accessed from a lower side of he vehicle.

Figure 13:
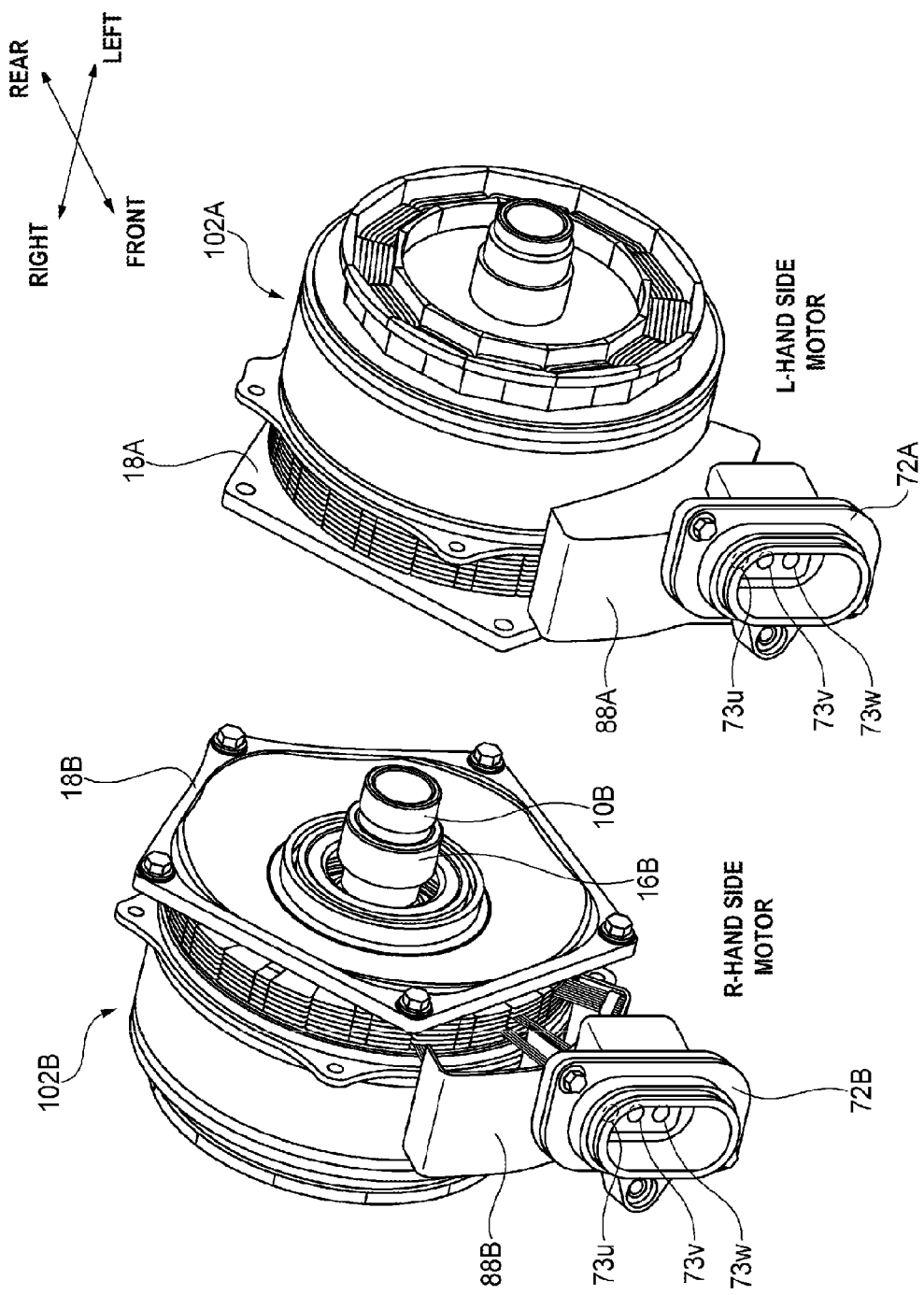
FIG. 13 shows a connecting structure for motor in which connecting points of connectors are aligned in a different way.
Figure 14:
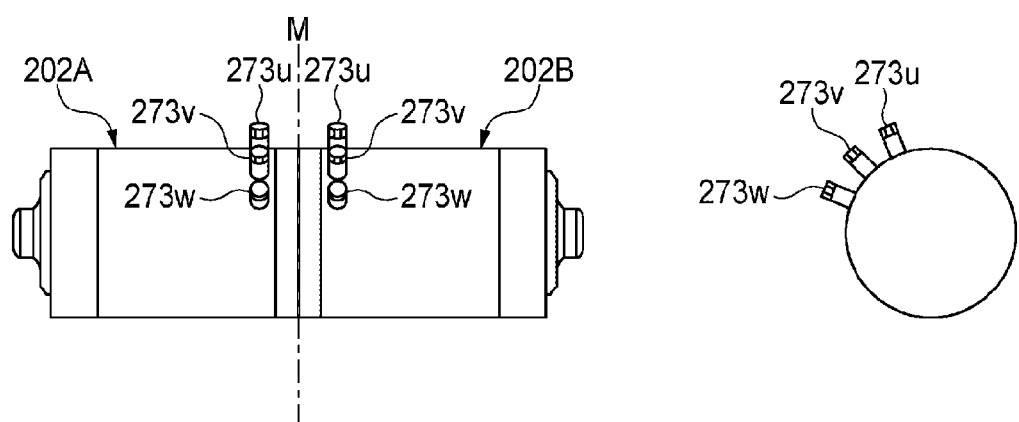
FIG. 14 is a drawing showing a connecting structure for motor described in Patent Literature 1.

Connecting points (a U-phase, V-phase and W-phase connecting points 73u, 73v, 73w) of the connector 72A with outside conductors are such that connecting points (the U-phase, V-phase and W-phase connecting points 73u, 73v, 73w) of the connector 72B with outside conductors are translated and are aligned in the same order as the order in which the connecting points of the connector 72B are aligned. As to this aligning order of the connecting points, the U-phase connecting point 73u, the V-phase connecting point 73v and the W-phase connecting point 73w may be aligned in a lateral direction, or they may be aligned in a vertical direction as shown in FIG. 13. In this way, since the connecting points (the U-phase, V-phase and W-phase connecting points 73u, 73v, 73w) in the connectors 72A, 72B with the outside conductors are aligned in the same order, the attaching and detaching properties of AC cables 85A (85B) can be enhanced, and further, the connectors 72A, 72B can be used commonly to the first and second motors 102A, 102B.

Figure 7:
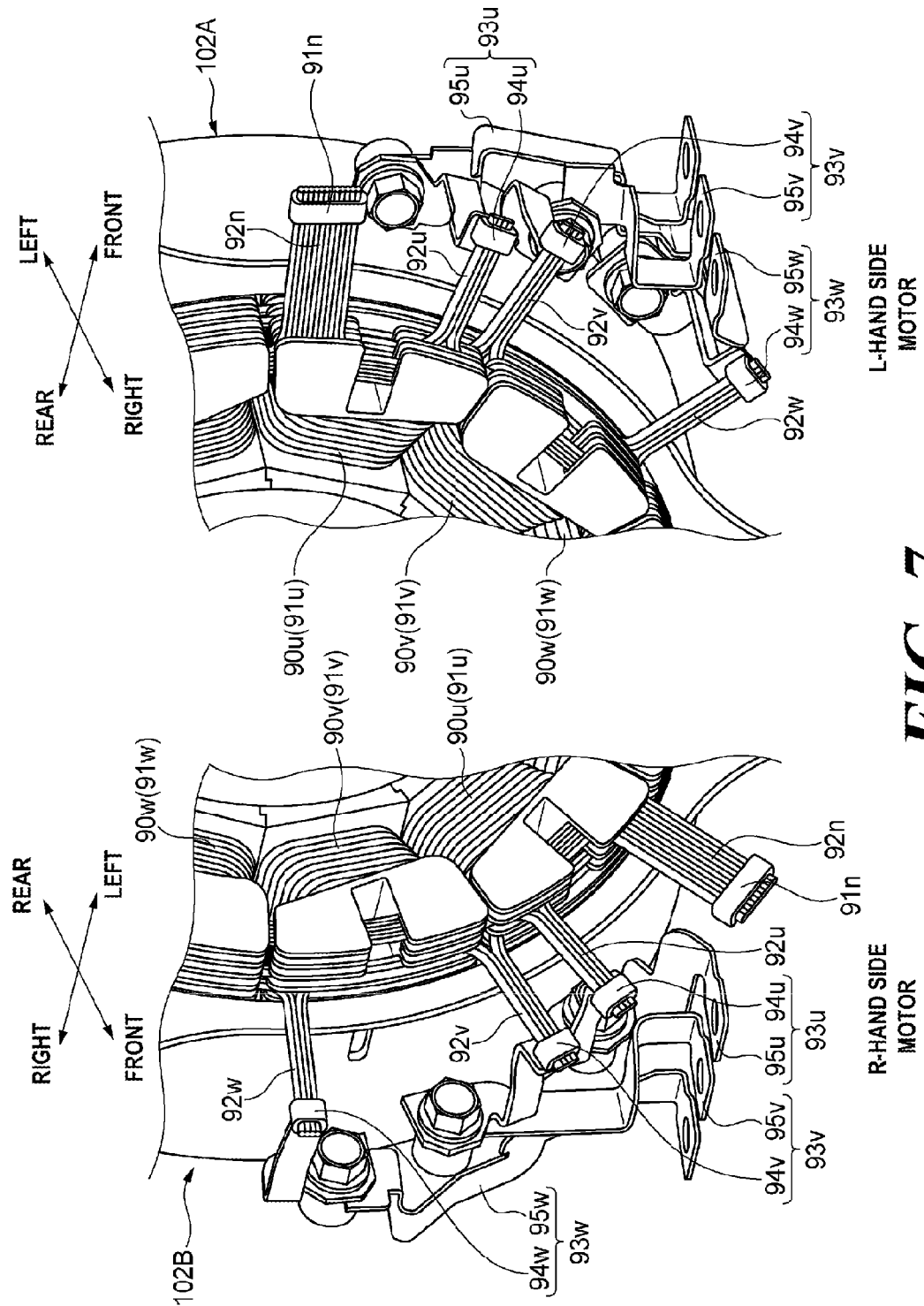
FIG. 7 shows partial perspective views of the first motor and the second motor as seen from the middle plane side, with terminal bases removed from FIG. 6.

As shown in FIG. 7, the lead conductor 92u of the U-phase divided stator piece group 91u is connected to a U-phase connecting terminal 94u, the lead conductor 92v of the V-phase divided stator piece group 91v is connected to a V-phase connecting terminal 94v, and the lead conductor 92w of the W-phase divided stator piece group 91w is connected to a W-phase connecting terminal 94w. The lead conductor 92n is connected to a neutral connector 91n and makes up a neutral point. Then, the connecting terminals (the U-phase, V-phase and W-phase connecting terminals 94u, 94v, 94w) of the three phases are connected to bus bars (a U-phase, V-phase and W-phase bus bars 95u, 95v, 95w) of three phases.

Figure 8:
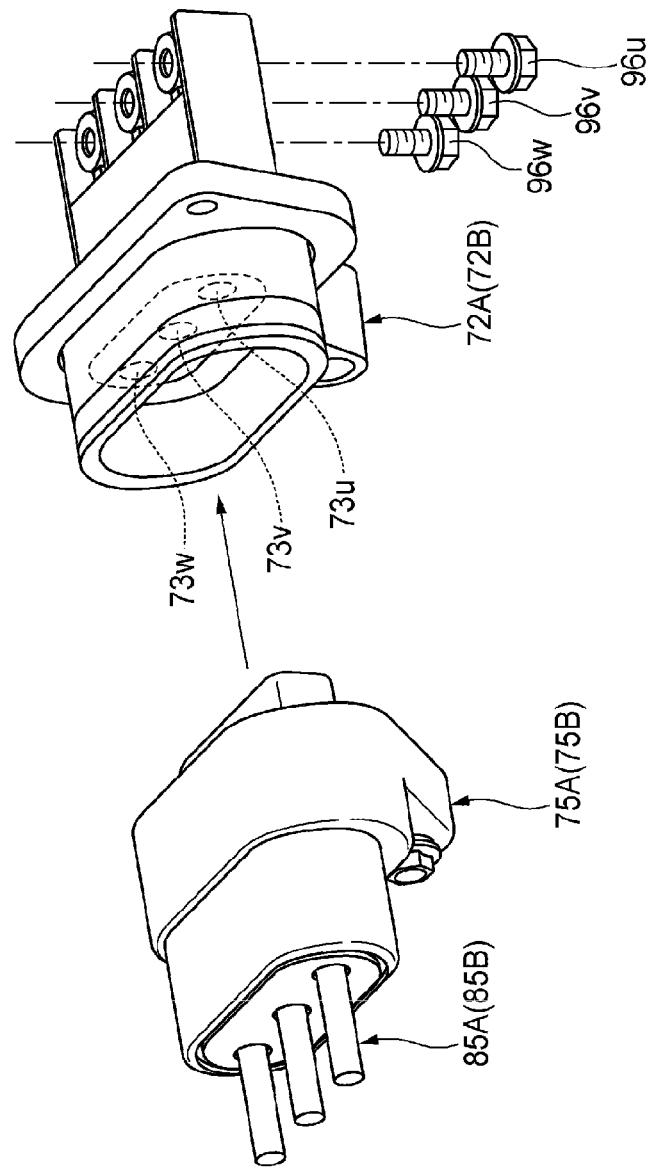
FIG. 8 is a perspective view depicting a connection between AC cables and a connector of the motor.

The bus bars (the U-phase, V-phase and W-phase bus bars 95u, 95v, 95w) of the three phases extend downwards and are fastened to the connector 72A (72B) with bolts 96u, 96v, 96w as shown in FIG. 8 for electrical connection with the connecting points (the U-phase, V-phase and W-phase connecting points 73u, 73v, 73w) of the three phases. Namely, the connecting terminals (the U-phase, V-phase and W-phase connecting terminals 94u, 94v, 94w) of the three phases and the bus bars (the U-phase, V-phase and W-phase bus bars 95u, 95v, 95w) of the three phases make up the relay conductors (the U-phase, V-phase and W-phase relay conductors 93u, 93v, 93w) which are connected to the lead conductors (the U-phase, V-phase and W-phase lead conductors 92u, 92v, 92w) at one ends and are connected to the connectors 72A, 72B at the other ends thereof. In FIG. 8, reference numeral 75A (75B) denotes a connector for the AC cables 85A (85B) which are connected to the connector 72A (72B) of the first and second motors 102A, 102B.

In this embodiment, the bus bars (the U-phase, V-phase and W-phase bus bars 95u, 95v, 95w) of the three phases of the first motor 102A and those of the second motor 102B have different sizes to thereby absorb a difference in distance between the connectors 72A, 72B which are disposed in the positions which are substantially mirror symmetric with each other with respect to the middle plane M and the lead conductors (the U-phase, V-phase and W-phase lead conductors 92u, 92v, 92w) of the three phases which are disposed in the positions which are non-mirror symmetric with each other with respect to the middle plane M, whereby the windings (the U-phase, V-phase and W-phase windings 80*u*, 80*v*, 80*w*) which make up the divided stator piece groups (the U-phase, V-phase and W-phase divided stator piece groups 91*u*, 91*v*, 91*w*) and the lead conductors (the U-phase, V-phase and W-phase lead conductors 92*u*, 92*v*, 92*w*) can be used commonly to the first and second motors 102A, 102B. Namely, as shown in FIG. 11, the difference in the distance defined between the lead conductors (the U-phase, V-phase and W-phase lead conductors 92*u*, 92*v*, 92*w*) of the three phases and the connecting points (the U-phase, V-phase and W-phase connecting points 73*u*, 73*v*, 73*w*) of the three phases between the first motor 102A and the second motor 102B is absorbed by causing the first motor 102A and the second motor 102B to have the relay conductors (the U-phase, V-phase and W-phase relay conductors 93*u*, 93*v*, 93*w*) having the difference sizes.

In this embodiment, the relay conductors (the U-phase, V-phase and W-phase relay conductors 93*u*, 93*v*, 93*w*) are made up of the connecting terminals (the U-phase, V-phase and W-phase connecting terminals 94*u*, 94*v*, 94*w*) and the bus bars (the U-phase, V-phase and W-phase bus bars 95*u*, 95*v*, 95*w*), and the connecting terminals (the U-phase, V-phase and W-phase connecting terminals 94*u*, 94*v*, 94*w*) of the first motor 102A and the connecting terminals (the U-phase, V-phase and W-phase connecting terminals 94*u*, 94*v*, 94*w*) of the second motor 102B are the same with each other, whereas only the bus bars (the U-phase, V-phase and W-phase bus bars 95*u*, 95*v*, 95*w*) are made to differ from each other between the first motor 102A and the second motor 102B, whereby the distances of the relay conductors (the U-phase, V-phase and W-phase relay conductors 93*u*, 93*v*, 93*w*) are made to differ between the first motor 102A and the second motor 102B. In this way, the relay conductors (the U-phase, V-phase and W-phase relay conductors 93*u*, 93*v*, 93*w*) are made up of the plural members, and the connecting terminals (the U-phase, V-phase and W-phase connecting terminals 94*u*, 94*v*, 94*w*) as parts of the plural members are the same for the first and second motors 102A, 102B, whereby the connecting terminals can further be used commonly to the first and second motors.

In the first and second motors 102A, 102B, terminal bases 88A, 88B which each hold the connecting terminals (the U-phase, V-phase and W-phase connecting terminals 94*u*, 94*v*, 94*w*) and the bus bars (the U-phase, V-phase and W-phase bus bars 95*u*, 95*v*, 95*w*) are attached to the side cases 11A, 11B, respectively (refer to FIG. 6). This facilitates the temporary holding of the bus bars (the U-phase, V-phase and W-phase bus bars 95*u*, 95*v*, 95*w*) and the connection of the connecting terminals (the U-phase, V-phase and W-phase connecting terminals 94*u*, 94*v*, 94*w*) and the bus bars (the U-phase, V-phase and W-phase bus bars 95*u*, 95*v*, 95*w*).

Figure 9:
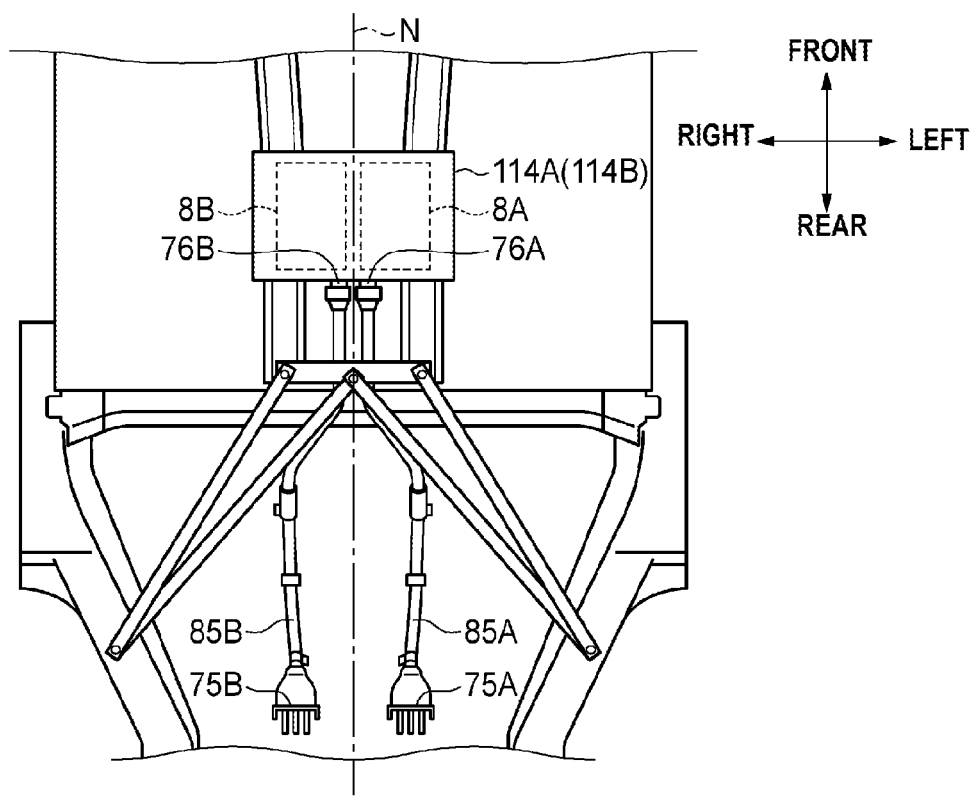
FIG. 9 is a view of the AC cables exposed from a lower side of the vehicle which depicts a connection between the AC cables and a controller.

FIG. 9 is a drawing which depicts a connection between the controller 8 shown in FIG. 1 and the connectors 72A, 72B of the first and second motors 102A, 102B and shows a view of the AC cables 85A (85B) exposed from the lower side of the vehicle 3.

The controller 8 includes a first motor controller 8A which is connected to the connector 72A of the first motor 102A and a second controller 8B which is connected to the connector 72B of the second motor 102B. The first motor controller 8A is accommodated in a first controller case 114A, and the second motor controller 8B is accommodated in a second controller case 114B. Although the first controller case 114A and the second controller case 114B are formed integrally in FIG. 9, they may be formed separately. A connector 76A which connects electrically an inside conductor with an outside conductor is formed in the first controller case 114A, and a connector 76B which connects electrically an inside conductor with an outside conductor is formed in the second controller case 114B. These connectors 76A, 76B are disposed in positions which lie substantially mirror symmetric with each other with respect to the central laterally dividing plane N, and the connector 76A is electrically connected by the connector 72A and the AC cables 85A of the first motor 102A and the connector 76B is electrically connected by the connector 72B and the AC cables 85B of the second motor 102B. Here, as described above, since the middle plane M coincides with the central laterally dividing plane N in the widthwise direction of the vehicle 3, in addition to the connectors 72A, 72B, the connectors 76A, 76B which are connected to the first and second motor controllers 8A, 8B also become mirror symmetric with each other with respect to the same plane (the middle plane M, the central laterally dividing plane N). This further enables the AC cables 85A, 85B which connect the first and second motors 102A, 102B with the first and second motor controllers 8A, 8B to be used commonly to the first and second motors 102A, 102B.

In this way, in this embodiment, in the first and second motors 102A, 102B, since the windings (the U-phase, V-phase and W-phase windings 80*u*, 80*v*, 80*w*) which make up the divided stator piece groups (the U-phase, V-phase and W-phase divided stator piece groups 91*u*, 91*v*, 91*w*) and the lead conductors (the U-phase, V-phase and W-phase lead conductors 92*u*, 92*v*, 92*w*) which are provided at the one ends of the windings (the U-phase, V-phase and W-phase windings 80*u*, 80*v*, 80*w*) are configured and disposed the same, they can be used commonly. The connecting terminals (the U-phase, V-phase and W-phase connecting terminals 94*u*, 94*v*, 94*w*), the AC cables 85A, 85B and the connectors 76A, 76B can also be used commonly. The attaching and detaching properties of the AC cables 85A, 85B to and from the first motor 102A and the second motor 102B can be enhanced by disposing the connector 72A of the first motor 102A and the connector 72B of the second motor 102B in the mirror symmetric positions. In addition to the suppression of axial enlargement, the lead conductors (the U-phase, V-phase and W-phase lead conductors 92*u*, 92*v*, 92*w*) are allowed to approach the connectors 72A, 72B by causing the lead conductors (the U-phase, V-phase and W-phase lead conductors 92*u*, 92*v*, 92*w*) to extend radially outwards relative to the windings (the U-phase, V-phase and W-phase windings 80*u*, 80*v*, 80*w*), whereby the sizes of the bus bars (the U-phase, V-phase and W-phase bus bats 95*u*, 95*v*, 95*w*) of the three phases can be reduced.

In this embodiment, as schematically shown in FIG. 10, the second motor main body 2B of the second motor 102B is disposed such that the first motor main body 2A of the first motor 102A is inverted relative to the middle plane M which intersects the straight line O which includes the rotational axis at right angles and which is positioned between the first motor main body 2A and the second motor main body 2B and the first motor main body 2A of the first motor 102A is rotated relatively by the predetermined amount so that the outgoing position 99A of the lead conductors (the U-phase, V-phase and W-phase lead conductors 92*u*, 92*v*, 92*w*) and the outgoing position 99B of the lead conductors (the U-phase, V-phase and W-phase lead conductors 92*u*, 92*v*, 92*w*) are situated in the mirror symmetric positions (FIG. 11). However, the invention is not limited thereto, and hence, with the first motor main body 2A of the first motor 102A kept inverted relative to the middle plane M, the second electric main body 2B of the second motor 102B may be disposed so that the outgoing position 99A of the lead conductors (the U-phase, V-phase and W-phase lead conductors 92u, 92v, 92w) and the outgoing position 99B of the lead conductors (the U-phase, V-phase and W-phase lead conductors 92u, 92v, 92w) are non-mirror symmetric with each other.

Figure 12:
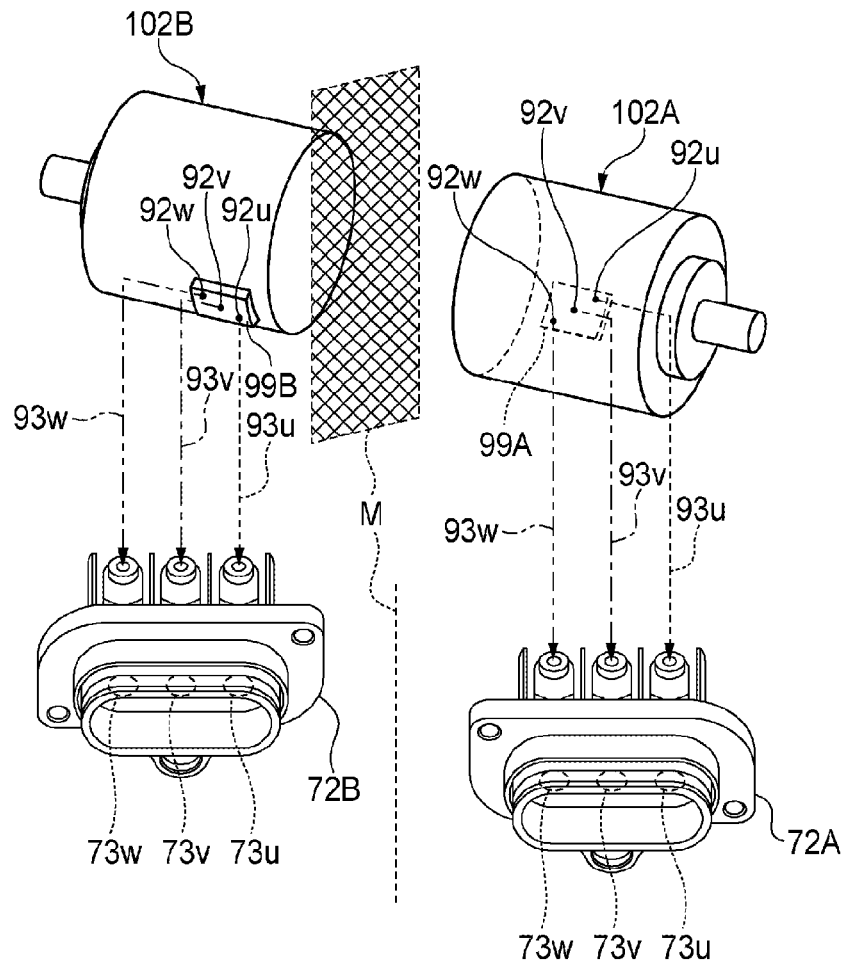
FIG. 12 is a schematic diagram of another embodiment which depicts a difference in sizes of a relay conductor of a first motor and a relay conductor of a second motor.

Even though this is the case, as shown in FIG. 12, a difference in distance defined between the connectors 72A, 72B which are disposed substantially in the mirror symmetric positions with respect to the middle plane M and the lead conductors (the U-phase, V-phase and W-phase lead conductors 92u, 92v, 92w) of the three phases which are disposed in the non-mirror symmetric positions with respect to the middle plane M between the first motor 102A and the second motor 102B is absorbed by disposing the connector 72A of the first motor 102A and the connector 72B of the second motor 102B substantially in the mirror symmetric positions relative to the middle plane M and causing the bus bars (the U-phase, V-phase and W-phase bus bars 95u, 95v, 95w) of the three phases to differ in size between the first motor 102A and the second motor 102B. By doing so, the windings (the U-phase, V-phase and W-phase windings 80u, 80v, 80w) which make up the divided stator piece groups (the U-phase, V-phase and W-phase divided stator piece groups 91u, 91v, 91w) and the lead conductors (the U-phase, V-phase and W-phase lead conductors 92u, 92v, 92w) can be used commonly, and further, the connectors 72A, 72B can also be used commonly.

The positions where the connectors 72A, 72B are disposed are not limited to the front side walls 11A*f*, 11B*f*, and hence, the positions of the connectors 72A, 72B can be set arbitrarily. However, since space is easier to be ensured in as longitudinal direction than in the widthwise direction (the transverse direction) and a vertical direction of the vehicle, the connectors 72A, 72B can be disposed without any difficulty when the first and second motors 102A, 102B are installed, and even though an external force is inputted into the vehicle, the damage to the vehicle can be reduced.

In the above-described embodiment, while the connector 72A of the first motor 102A and the connector 72B of the second motor 102B are disposed substantially in the mirror symmetric positions with respect to the middle plane M, the invention is not limited thereto. Hence, even when the connector 72A of the first motor 102A and the connector 72B of the second motor 102B are disposed in the non-mirror symmetric positions with respect to the middle plane M, as long as the connecting points (the U-phase, V-phase and W-phase connecting points 73u, 73v, 73w) of the connector 72A with the outside conductors and the connecting points (the U-phase, V-phase and W-phase connecting points 73u, 73v, 73w) of the connector 72B with the outside conductors are aligned in the same order such that the connecting points (the U-phase, V-phase and W-phase connecting points 73u, 73v, 73w) of the connector 72B with the outside conductors are translated to the connecting points (the U-phase, V-phase and W-phase connecting points 73u, 73v, 73w) of the connector 72A with the outside conductors or vice versa, the attaching and detaching properties of the AC cables 85A (85B) can be enhanced, and further, the connectors 72A, 72B can be used commonly to the first and second motors 102A, 102B.

In the above-described embodiment, while the windings (the U-phase, V-phase and W-phase windings 80u, 80v, 80w) which make up the divided stator piece groups (the U-phase, V-phase and W-phase divided stator piece groups 91u, 91v, 91w) and the lead conductors (the U-phase, V-phase and W-phase lead conductors 92u, 92v, 92w) have the same configurations between the first and second motors 102A, 102B as well as the stators 14A, 14B having the same sizes, the windings (the U-phase, V-phase and W-phase windings 80u, 80v, 80w) do not necessarily have to be made common to the first and second motors 102A, 102B, causing only the lead conductors (the U-phase, V-phase and W-phase lead conductors 92u, 92v, 92w) to be made common thereto.

The invention is not limited to the embodiment that has been described heretofore and hence can be modified or improved as required.

In the embodiment, while the vehicle drive system of the invention is described as being installed at the rear part of the vehicle as the rear-wheel drive system, the vehicle drive system may be installed at a front part of the vehicle as a front-wheel drive system. As this occurs, by disposing the connectors 72A, 72B on rear side surfaces, the damage to the connectors 72A, 72B can be reduced when an external force is inputted into the vehicle from the front or rear of the vehicle.

The drive system can adopt an arbitrary configuration as long as it includes the first motor and the second motor. The drive system does not necessarily have to include the first and second planetary gear speed reducers and hence can adopt any other speed reducer. Alternatively, the speed reducers can also be omitted.

The first and second motors may each include a central distributor member in which windings of the same phases are connected to each other in an annular fashion. Then, as this occurs, the lead conductors are provided at one side of the central distributor member.

The first and second motors are not limited to the three-phase AC motor, and hence, arbitrary motors including a single-phase motor can be adopted.

The drive system can be applied not only to the hybrid vehicle but also to electric vehicles, as well as various types of vehicles which can be driven by a motor.

This patent application is based on Japanese Patent Application (No. 2011-255235) filed on Nov. 22, 2011, the contents of which are incorporated herein by reference.

DESCRIPTION OF REFERENCE NUMERALS AND CHARACTERS

2A first motor main body; 2B second motor main body; 3 vehicle; 8A first motor controller; 8B second motor controller; 11A, 11B side case (casing); 11A*f*, 11B*f* side wall; 14A, 14B stator; 15A, 15B rotor; 72A, 72B connector (inside-outside connecting conductor); 73u, 73v, 73w U-phase, V-phase, W-phase connecting point (first-phase inside-outside connecting point, second-phase inside-outside connecting point; 76A connector (first different inside-outside connecting conductor); 76B connector (second different inside-outside connecting conductor); 80u, 80v, 80w U-phase, V-phase, W-phase winding (first-phase winding, second-phase winding, third-phase winding); 88A, 88B terminal base; 92u, 92v, 92w U-phase, V-phase, W-phase lead conductor (first-phase lead conductor, second-phase lead conductor, third-phase lead conductor); 93u, 93v, 93w U-phase, V-phase, W-phase relay conductor (first-phase relay conductor, second-phase relay conductor, third-phase relay conductor); 94u, 94v, 94w U-phase, V-phase, W-phase connecting terminal; 95u, 95v, 95w U-phase, V-phase, W-phase bus bar; 99A, 99B outgoing position; 102A first motor; 102B second motor; 114A first controller case; 114B second controller case; O straight line; M middle plane: LWr left rear wheel (left wheel); RWr right rear wheel (right wheel).

The invention claimed is:

1. A connecting structure for motor including:
   a first motor; and
   a second motor, each of which includes:
   a motor main body including
   a stator having at least a first-phase winding and a first-phase lead conductor which outwardly extends from one end side of the first-phase winding and
   a rotor which is disposed so as to rotate relative to the stator;
   a casing which accommodates the motor main body;
   an inside-outside connecting conductor which connects electrically an inside conductor with an outside conductor of the casing; and
   a first-phase relay conductor which is accommodated in the casing and which is connected to the first-phase lead conductor at one end side and is connected to the inside-outside connecting conductor at the other end side,
   wherein a rotational axis of the first motor and a rotational axis of the second motor are disposed on the same straight line,
   wherein the inside-outside connecting conductor of the first motor and the inside-outside connecting conductor of the second motor are disposed substantially in mirror symmetric positions with respect to a middle plane which intersects the straight line at right angles and which is situated between the first motor main body and the second motor main body, and the first-phase lead conductor of the first motor and the first-phase lead conductor of the second motor are disposed in non-mirror symmetric positions with respect to the middle plane, and
   wherein a size of the first-phase relay conductor of the first motor and a size of the first-phase relay conductor of the second motor differ from each other.

2. The connecting structure for motor of claim 1,
   wherein sizes of at least the respective stators of the first motor and the second motor are the same, and
   wherein a relative configuration form in which the first-phase lead conductor is disposed relative to the stator in the first motor and a relative configuration form in which the first-phase lead conductor is disposed relative to the stator in the second motor are the same.

3. The connecting structure for motor of claim 2,
   wherein the motor main body of the second motor is disposed such that the motor main body of the first motor is inverted relative to the middle plane or such that the motor main body of the first motor is inverted and the motor main body of the second motor is rotated relative to the motor main body of the first motor by a predetermined amount.

4. The connecting structure for motor of any one of claim 1,
   wherein the first-phase relay conductor includes a terminal which is connected to the first-phase lead conductor at one end side and a bus bar which is connected to the inside-outside connecting conductor at one end side, and the other end side of the terminal is connected to the other end side of the bus bar, and
   wherein a size of the bus bar of the first motor and a size of the bus bar of the second motor differ from each other, and a size of the terminal of the first motor and a size of the terminal of the second motor are the same with each other.

5. The connecting structure for motor of claim 4,
   wherein the first motor and the second motor each includes a terminal base which holds the terminal and the bus bar.

6. The connecting structure for motor of any one of claim 1,
   wherein the first-phase lead conductor extends radially outwards of the first-phase winding.

7. The connecting structure for motor of any one of claim 1,
   wherein the first motor and the second motor each has a second-phase winding and a third-phase winding which are different from the first-phase winding, a second-phase lead conductor outwardly extends from one end side of the second-phase winding, and a third-phase lead conductor outwardly extends from one end side of the third-phase winding,
   wherein the first motor and the second motor each has a second-phase relay conductor which is accommodated in the casing and which is connected to the second-phase lead conductor at one end side and is connected to the inside-outside connecting conductor at the other end side and a third-phase relay conductor which is accommodated in the casing and which is connected to the third-phase lead conductor at one end side and is connected to the inside-outside connecting conductor at the other end side,
   wherein the second-phase lead conductor of the first motor and the second-phase lead conductor of the second motor are disposed in non-mirror symmetric positions with respect to the middle plane,
   wherein a size of the second-phase relay conductor of the first motor and a size of the second-phase relay conductor of the second motor differ from each other,
   wherein the third-phase lead conductor of the first motor and the third-phase lead conductor of the second motor are disposed in non-mirror symmetric positions with respect to the middle plane, and
   wherein a size of the third-phase relay conductor of the first motor and a size of the third-phase relay conductor of the second motor differ from each other.

8. The connecting structure for motor of any one of claim 1,
   wherein the first motor is connected to a left wheel,
   wherein the second motor is connected to a right wheel of the vehicle,
   the first motor and the second motor are disposed at the left and right in a widthwise direction of the vehicle, and
   wherein the middle plane is situated substantially on a central laterally dividing plane in the widthwise direction of the vehicle.

9. The connecting structure for motor of any one of claim 1, further including:
   a first motor controller which is connected to the inside-outside connecting conductor of the first motor;
   a second motor controller which is connected to the inside-outside connecting conductor of the second motor;
   a first different casing which accommodates the first motor controller:
   a second different casing which accommodates the second motor controller;
   a first different inside-outside connecting conductor which connects electrically an inside conductor with an outside conductor of the first different casing;
   a second different inside-outside connecting conductor which connects electrically an inside conductor with an outside conductor of the second different casing,
   wherein the first different inside-outside connecting conductor and the second different inside-outside connecting conductor are disposed substantially in mirror symmetric positions with respect to the middle plane.

10. A connecting structure for motor including:
a first motor; and
a second motor, each of which includes:
   a motor main body including
      a stator having at least plural windings of plural phases including a first-phase winding and a second-phase winding, a first-phase lead conductor which outwardly extends from one end side of the first-phase winding and a second-phase lead conductor which outwardly extends from one end side of the second-phase winding and
      a rotor which is disposed so as to rotate relative to the stator;
   a casing which accommodates the motor main body;
   inside-outside connecting conductors each of which connects electrically an inside conductor with an outside conductor of the casing for each phase;
   a first-phase relay conductor which is accommodated in the casing and which is connected to the first-phase lead conductor at one end side and is connected to the inside-outside connecting conductors at the other end side, and
   a second-phase relay conductor which is accommodated in the casing and which is connected to the second-phase lead conductor at one end side and is connected to the inside-outside connecting conductors at the other end side,
wherein a rotational axis of the first motor and a rotational axis of the second motor are disposed on the same straight line,
wherein the first-phase lead conductor and the second-phase lead conductor of the second motor are disposed such that the first-phase lead conductor and the second-phase lead conductor of the first motor are inverted with respect to a middle plane which intersects the straight line at right angles and which is situated between the first motor main body and the second motor main body or such that the first-phase lead conductor and the second-phase lead conductor of the first motor are inverted with respect to the middle plane and rotated relatively, and
wherein a first-phase inside-outside connecting point which is connected to the first-phase relay conductor and a second-phase inside-outside connecting point which is connected to the second-phase relay conductors of the inside-outside connecting conductors of the second motor are disposed such that a first-phase inside-outside connecting point which is connected to the first-phase relay conductor and a second-phase inside-outside connecting point which is connected to the second-phase relay conductors of the inside-outside connecting conductors of the first motor are translated.

11. The connecting structure for motor of claim 10,
wherein the inside-outside connecting conductors of the first motor and the inside-outside connecting conductors of the second motor are disposed substantially in mirror symmetric positions with respect to the middle plane.

12. The connecting structure for motor of claim 10,
wherein the first-phase lead conductor and the second-phase lead conductor of the second motor are disposed such that the first-phase lead conductor and the second-phase lead conductor of the first motor are inverted with respect to the middle plane and rotated relatively, and an outgoing position of the first-phase lead conductor and the second-phase lead conductor of the first motor and an outgoing position of the first-phase lead conductor and the second-phase lead conductor of the second motor are disposed substantially in mirror symmetric positions with respect to the middle plane.

13. The connecting structure for motor of any one of claim 10,
wherein sizes of the respective stators of the first motor and the second motor are the same, and
wherein a relative configuration form in which the first-phase lead conductor and the second-phase lead conductor are disposed relative to the stator in the first motor and a relative configuration form in which the first-phase lead conductor and the second-phase lead conductor are disposed relative to the stator in the second motor are the same.

14. The connecting structure for motor of any one of claim 10,
wherein the first-phase and second-phase lead conductors extend radially outwards of the first-phase and second-phase windings, respectively.

15. The connecting structure for motor of any one of claim 10,
wherein the first motor is connected to a left wheel,
wherein the second motor is connected to a right wheel of the vehicle,
wherein the first motor and the second motor are disposed at the left and right in a widthwise direction of the vehicle, and
wherein the middle plane is situated substantially on a central laterally dividing plane in the widthwise direction of the vehicle.

16. The connecting structure for motor of claim 15,
wherein the vehicle is formed so that a longitudinal length is larger than a transverse length, and
wherein the inside-outside connecting conductors of the first motor is disposed on, among side surfaces of the casing of the first motor, either of side surfaces which face a front and a rear of the vehicle, and the inside-outside connecting conductors of the second motor is disposed on, among side surfaces of the casing of the second motor, either of side surfaces o which face the front and the rear of the vehicle.

17. The connecting structure for motor of claim 16,
wherein the inside-outside connecting conductors of the first motor and the inside-outside connecting conductors of the second motor are disposed on, among the side surfaces which face the front and the rear of the vehicle, either of the side surfaces which lies closer to a longitudinal center of the vehicle.

18. The connecting structure for motor of any one of claim 10, further including:
   a first motor controller which is connected to the inside-outside connecting conductors of the first motor;
   a second motor controller which is connected to the inside-outside connecting conductors of the second motor;
   a first different casing which accommodates the first motor controller:
   a second different casing which accommodates the second motor controller;
   a first different inside-outside connecting conductor which connects electrically an inside conductor with an outside conductor of the first different casing;
   a second different inside-outside connecting conductor which connects electrically an inside conductor with an outside conductor of the second different casing,
wherein the first different inside-outside connecting conductor and the second different inside-outside connecting conductor are disposed substantially in mirror symmetric positions with respect to the middle plane.

* * * * *